(12) United States Patent
Ito et al.

(10) Patent No.: US 11,603,225 B2
(45) Date of Patent: Mar. 14, 2023

(54) ARTICLE PROCESSING APPARATUS

(71) Applicant: Daifuku Co., Ltd., Nishiyodogawa-ku (JP)

(72) Inventors: Kazutoshi Ito, Tokyo (JP); Osamu Futami, Tokyo (JP); Tadasuke Ogawa, Tokyo (JP); Atsushi Minoo, Tokyo (JP); Yusuke Fujii, Tokyo (JP)

(73) Assignee: Daifuku Co., Ltd., Nishiyodogawa-ku (JP)

( * ) Notice: Subject to any disclaimer, the term of this patent is extended or adjusted under 35 U.S.C. 154(b) by 0 days.

(21) Appl. No.: 17/357,175

(22) Filed: Jun. 24, 2021

(65) Prior Publication Data

US 2021/0403190 A1     Dec. 30, 2021

(30) Foreign Application Priority Data

Jun. 30, 2020   (JP) .............................. JP2020-113246

(51) Int. Cl.
*B65B 35/50*     (2006.01)
*B65B 57/10*     (2006.01)
*B65G 57/03*     (2006.01)

(52) U.S. Cl.
CPC .............. *B65B 35/50* (2013.01); *B65B 57/10* (2013.01); *B65G 57/03* (2013.01)

(58) Field of Classification Search
CPC ......... B65B 35/50; B65B 57/10; B65G 57/03; B65G 19/00; B65G 57/245; B65G 57/24; B65G 57/06; B65G 57/22

(Continued)

(56) References Cited

U.S. PATENT DOCUMENTS 5,844,807 A * 12/1998 Anderson ............ B65G 57/245
                                                       414/789.6
6,957,943 B2 * 10/2005 Hahn ..................... B65H 31/24
                                                       414/929

(Continued)

FOREIGN PATENT DOCUMENTS

JP     05-105234 A     4/1993
JP     05-31911 A     12/1993

(Continued)

OTHER PUBLICATIONS

Japanese Office Action issued in Japanese Patent Application No. 2020-113246 dated Jan. 31, 2023, citing references 15-21 therein, (w/ English Translation).

*Primary Examiner* — Gregory W Adams
(74) *Attorney, Agent, or Firm* — Oblon, McClelland, Maier & Neustadt, L.L.P.

(57) ABSTRACT

An article processing apparatus includes: a configuration determination unit configured to determine a configuration of at least one transport unit including articles, and stacked article groups each including a pallet, and at least one of the articles placed on the pallet, wherein the at least one of the articles is placed on the pallet in a manner that allows a pallet of another article group to be placed thereon, excluding uppermost one of the stacked article groups; a palletizing mechanism configured to place the at least one of the articles on the pallet so as to form each of the article groups included in the transport unit whose configuration is determined by the configuration determination unit; and a stacking mechanism configured to stack the article groups formed by the palletizing mechanism so as to form the transport unit determined by the configuration determination unit.

10 Claims, 13 Drawing Sheets

(58) Field of Classification Search
USPC .......................................... 414/799, 927–929
See application file for complete search history.

(56) References Cited

U.S. PATENT DOCUMENTS

| | | | |
|---|---|---|---|
| 8,147,177 B2* | 4/2012 | Huber | B65G 47/086 |
| | | | 414/791.4 |
| 8,442,671 B2* | 5/2013 | Beck | B65G 57/24 |
| | | | 198/395 |
| 10,196,219 B2* | 2/2019 | Frigeri | B65G 57/24 |

FOREIGN PATENT DOCUMENTS

| | | |
|---|---|---|
| JP | 07-291451 A | 11/1995 |
| JP | 2001-072243 A | 3/2001 |
| JP | 2001-072243 A | 3/2001 |
| JP | 2001-171839 A | 6/2001 |
| JP | 2002-037422 A | 2/2002 |
| JP | 2002-114373 A | 4/2002 |

\* cited by examiner

ARTICLE PROCESSING APPARATUS

The present application claims priority to and incorporates by reference the entire contents of Japanese Patent Application No. 2020-113246 filed in Japan on Jun. 30, 2020.

BACKGROUND

The present disclosure relates to an article processing apparatus.

There is known a method of alternately stacking pallets and articles, for collective transport of the articles (see JP 2001-72243 A, for example). In this case, an upper pallet is placed on the articles.

SUMMARY

It is advantageous if, for example, such a transport form in which pallets and articles are alternately stacked is formed more reliably or more quickly.

There is a need for an article processing apparatus having a more useful and novel configuration for forming a transport unit in which pallets and a plurality of articles are alternately stacked.

According to one aspect of the present disclosure, there is provided an article processing apparatus including: a configuration determination unit configured to determine a configuration of at least one transport unit, the at least one transport unit including articles, and stacked article groups each including a pallet, and at least one of the articles placed on the pallet, wherein the at least one of the articles is placed on the pallet in a manner that allows a pallet of another article group to be placed thereon, excluding uppermost one of the stacked article groups; a palletizing mechanism configured to place the at least one of the articles on the pallet so as to form each of the article groups included in the transport unit whose configuration is determined by the configuration determination unit; and a stacking mechanism configured to stack the article groups formed by the palletizing mechanism so as to form the transport unit determined by the configuration determination unit.

DETAILED DESCRIPTION

Hereinafter, an exemplary embodiment of the present disclosure will be disclosed. The configurations of the embodiment described below and the actions and results (effects) obtained from the configurations are examples. The present disclosure may also be achieved by configurations other than those disclosed in the following embodiment. Furthermore, according to the present disclosure, it is possible to obtain at least one of various effects (including derivative effects) obtained by the following configurations.

Note that in the present specification, ordinal numbers are given for convenience to distinguish between component parts, portions, parameters, or the like and does not intend to indicate a priority order or sequential order.

Furthermore, in some figures, directions are indicated by arrows in a transport unit forming apparatus 100. X, Y, and Z directions intersect each other and are orthogonal to each other. The Z direction extends approximately along the vertical direction, and an arrow Z indicates vertically upward. The X and Y directions each extend approximately along a horizontal direction.

Figure 1:
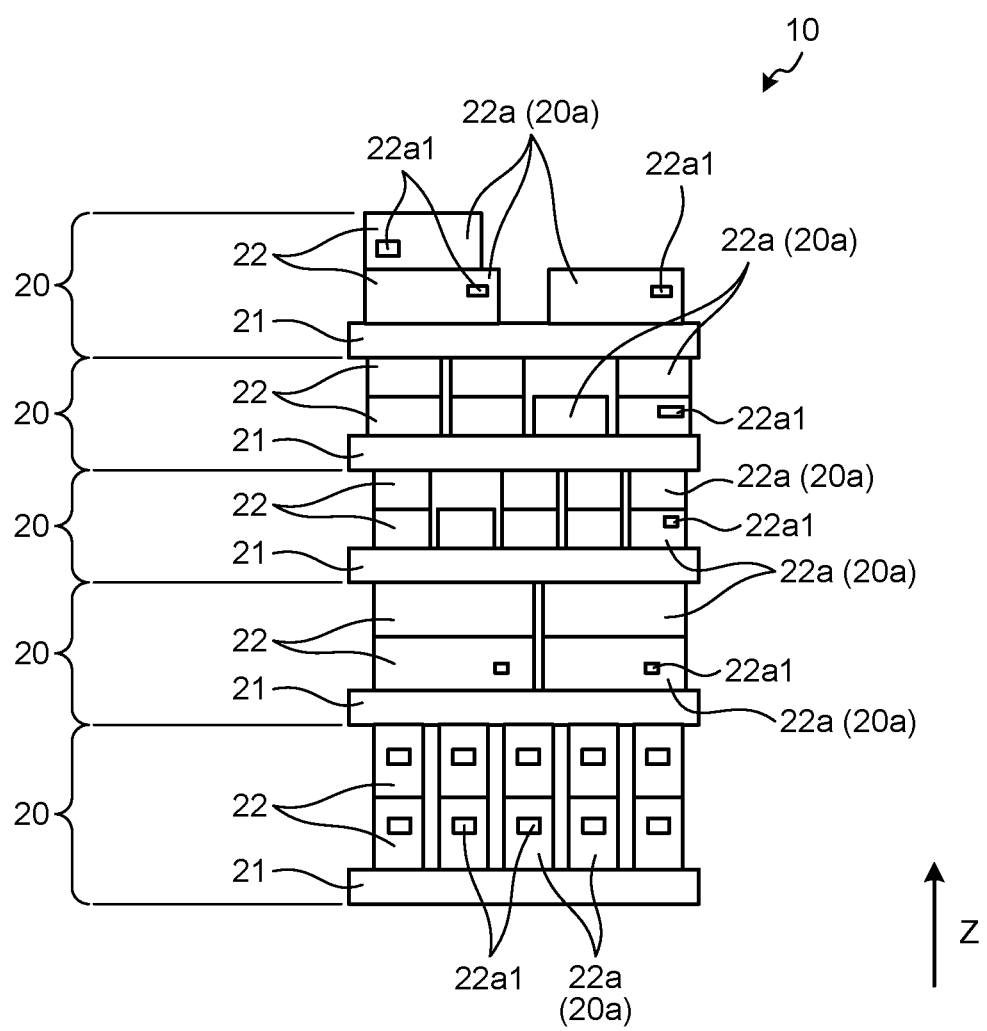
FIG. 1 is a schematic and exemplary side view of a transport unit formed by an article processing apparatus according to an embodiment.

FIG. 1 is a side view of a transport unit 10. The transport unit 10 is a unit for transport of a plurality of articles 22. The plurality of articles 22 is collected into at least one transport unit 10 and transported in the form of the transport unit 10.

As illustrated in FIG. 1, the transport unit 10 includes at least one article group 20. The article group 20 includes a pallet 21 and at least one article 22 placed on the pallet 21.

The transport unit 10 includes a plurality of article groups 20 stacked, in some cases. In this case, in an article group 20 in each layer except at least the uppermost layer, a plurality of articles 22 is stacked on a pallet 21 so that another pallet 21 may be placed thereon. Therefore, another pallet 21, that is, another article group 20 may be placed on a plurality of articles 22 placed on a pallet 21, and thus, the plurality of article groups 20 may be stacked. At the upper end of such article group 20, a plurality of articles 22 placed on a pallet 21 forms a stacked portion that is configured to place another pallet 21 thereon stably and substantially horizontally. An article group 20 of each layer except the uppermost layer, that is, an article group 20 that is configured to place another pallet 21, that is, another article group 20 thereon is an example of a first article group.

Furthermore, the transport unit 10 may have an article group 20 that is not configured to place another pallet 21 thereon, on the uppermost layer. Furthermore, when the transport unit 10 has only one article group 20, the one article group 20 may not be configured to place another pallet 21 thereon. The article group 20 that is not configured to place another pallet 21 thereon has a pallet 21 and at least one article 22 that is placed on the pallet 21 so that the another pallet 21 may not be placed thereon. At the upper end of such article group 20, the stacked portion that is configured to place another pallet 21 thereon is not formed. An article group 20 that is not configured to place another pallet 21, that is, another article group 20 thereon is an example of a second article group.

A pallet 21 is a platform that has a square plate shape and is configured to place an article 22 thereon. The pallet 21 is, for example, a flat pallet such as a double-sided pallet. However, the pallet 21 is not limited to the double-sided pallet or flat pallet and may be a pallet of another form.

An article 22 has a shape that is configured to place another article 22 thereon and has, for example, a case (box) that has a cuboid shape and a content (not illustrated) that is stored in the case. However, the article 22 preferably has a shape that is configured to place another article 22 thereon and that is configured to be placed on another article 22, and may have a shape other than the cuboid shape. Furthermore, the article 22 may not have the case.

An article group 20 includes a plurality of articles 22 having cases of the same shape, in some cases. Furthermore, in some cases, the article group 20 includes, as the plurality of articles 22, the same articles of different specifications, for example, products of the same brand having different specifications, such as food products of the same brand having different tastes and contained in the cases of the same shape. Such article group 20 facilitates to handle the articles 22 at a delivery destination of the transport unit 10, in some cases. An article group 20 including, as the articles 22, only the same articles 22 having different specifications is an example of a third article group.

Figure 2:
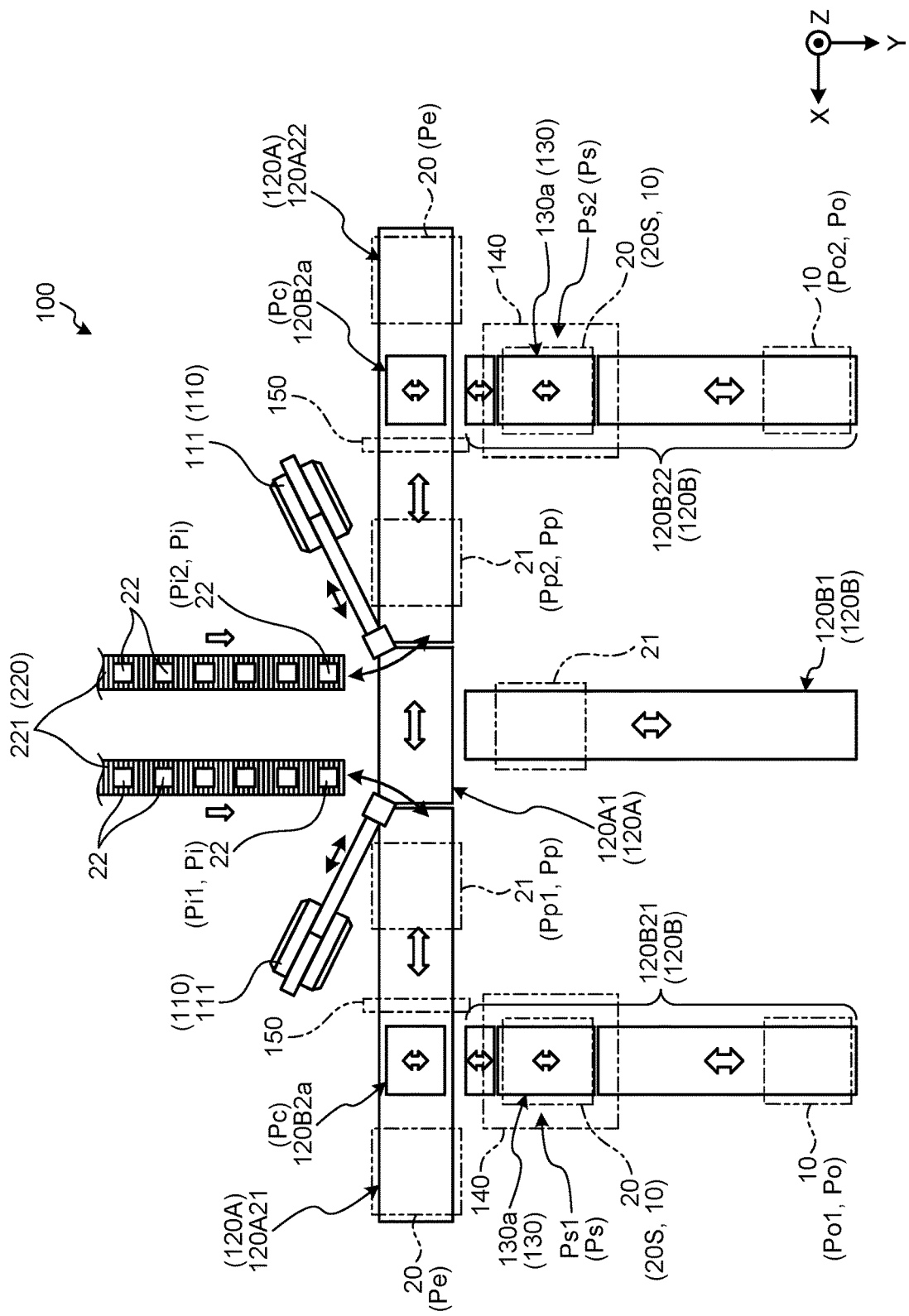
FIG. 2 is a schematic and exemplary plan view of the article processing apparatus according to the embodiment.
Figure 5:
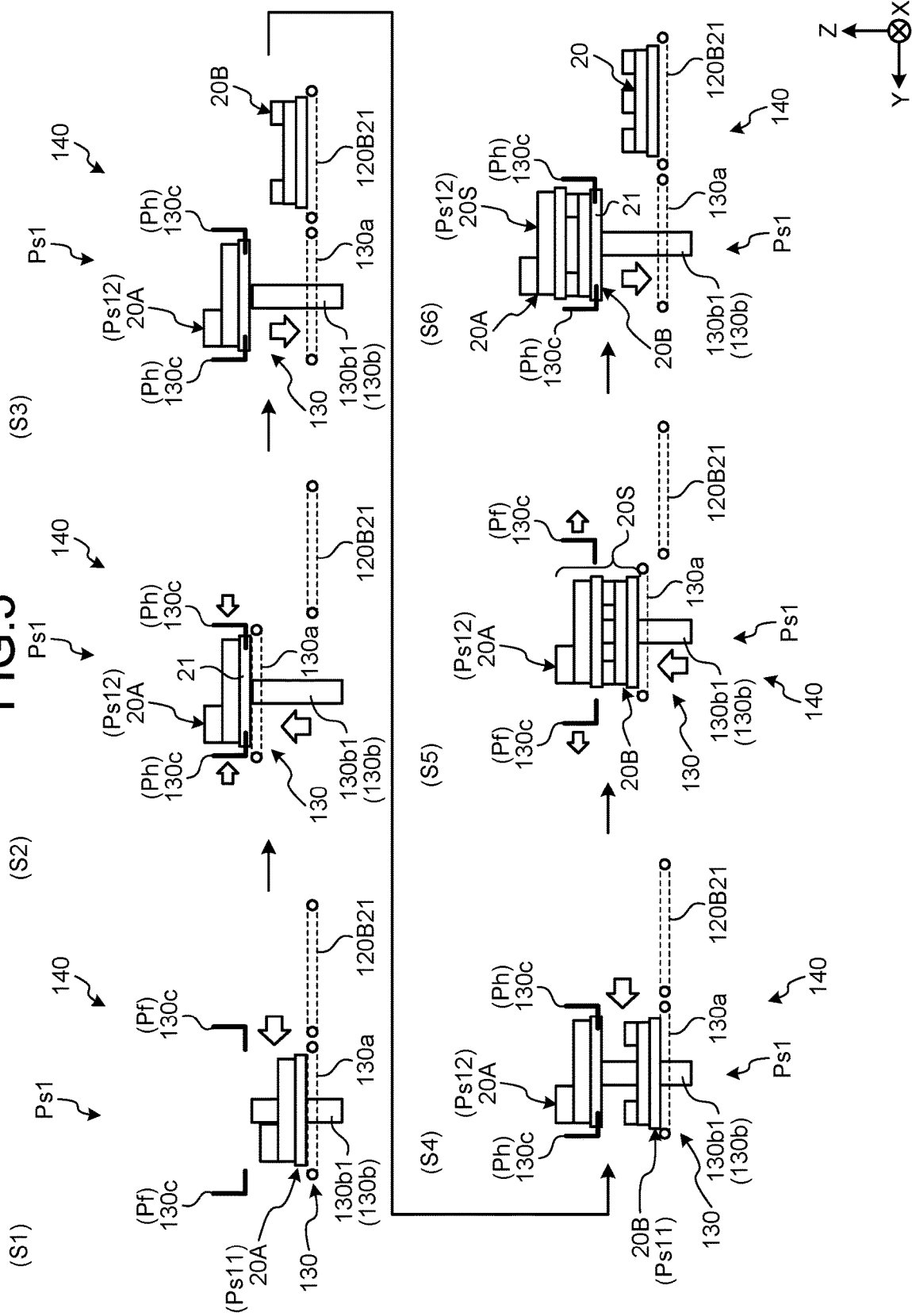
FIG. 5 is a schematic and exemplary side view of a stacking mechanism of the article processing apparatus according to the embodiment, illustrating a procedure of stacking.

FIG. 2 is a plan view of the transport unit forming apparatus 100. As illustrated in FIG. 2, the transport unit forming apparatus 100 includes a palletizing mechanism 110 and conveyance mechanisms 120A and 120B. Furthermore, the transport unit forming apparatus 100 includes a lift mechanism 130 and a stacking mechanism 140, which are also illustrated in FIG. 5, in each of stacking places Ps (Ps1, Ps2). The operations of the palletizing mechanism 110, conveyance mechanisms 120A and 120B, lift mechanism 130, and stacking mechanism 140 are controlled by an operation control unit 163 (see FIG. 6). The transport unit forming apparatus 100 is an example of an article processing apparatus.

The palletizing mechanism 110 forms an article group 20 by placing at least one article 22 on an empty pallet 21 located at a palletizing position Pp. The palletizing mechanism 110 has a robot arm 111, such as an articulated robot. The palletizing mechanism 110 places the article 22 conveyed from an automated warehouse 200 (see FIG. 6) to a reception position Pi by a conveyance mechanism 220 such as a conveyor 221, on the pallet 21 located at the palletizing position Pp or on an article 22 already placed on the pallet 21. In this way, the article group 20 is formed at the palletizing position Pp. The palletizing mechanism 110 sequentially forms a plurality of article groups 20 according to a predetermined forming plan for a transport unit 10.

Figure 3:
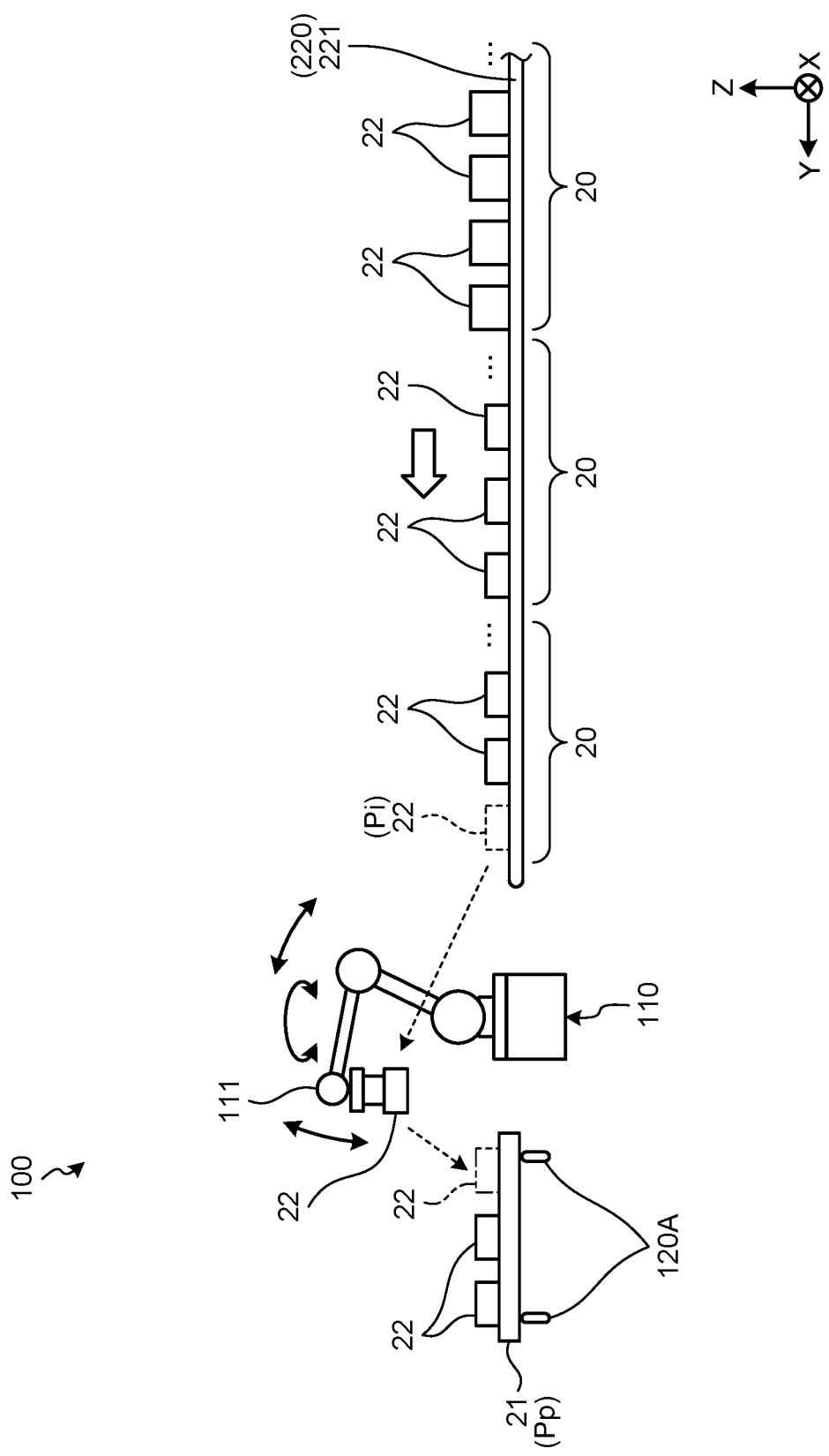
FIG. 3 is an exemplary conceptual diagram illustrating the order of conveyance of articles to a reception position of the article processing apparatus according to the embodiment.

FIG. 3 is a conceptual diagram illustrating the order of conveyance of articles 22 to the reception position Pi. As illustrated in FIG. 3, the conveyance mechanism 220 including the conveyor 221 conveys a plurality of articles 22 from the automated warehouse 200 to the reception position Pi in the order that the palletizing mechanism 110 places the articles 22 on a pallet 21. The palletizing mechanism 110 places articles 22 conveyed by the conveyance mechanism 220 and arriving at the reception position Pi, on the pallet 21 or on an article 22 placed on the pallet 21, one by one in the order of arrival, forming an article group 20.

The order of placing the articles 22 for each article group 20, that is, the order of conveyance of the articles 22 is determined so that the interference between the palletizing mechanism 110 (robot arm 111) and the articles 22 already placed may be avoided in operation of the palletizing mechanism 110. Specifically, the order of placing the articles 22, that is, the order of conveyance of the articles 22 from the automated warehouse 200 (hereinafter referred to as the order of conveyance of the articles 22) is determined so as to, for example, firstly convey an article 22 to be arranged at a position of the pallet 21 that is far from the palletizing mechanism 110. Furthermore, the order of conveyance of the articles 22 is determined so that, for example, when articles 22 are to be stacked into a plurality of stages in an article group 20, an article 22 to be located in a lower stage is firstly conveyed.

Furthermore, the order of conveyance of articles 22 is determined according to the order of article groups 20 formed by the palletizing mechanism 110. In other words, articles 22 included in an article group 20 to be formed by the palletizing mechanism 110 first are conveyed first, and articles 22 included in an article group 20 to be formed later by the palletizing mechanism 110 are conveyed later.

Figure 4:
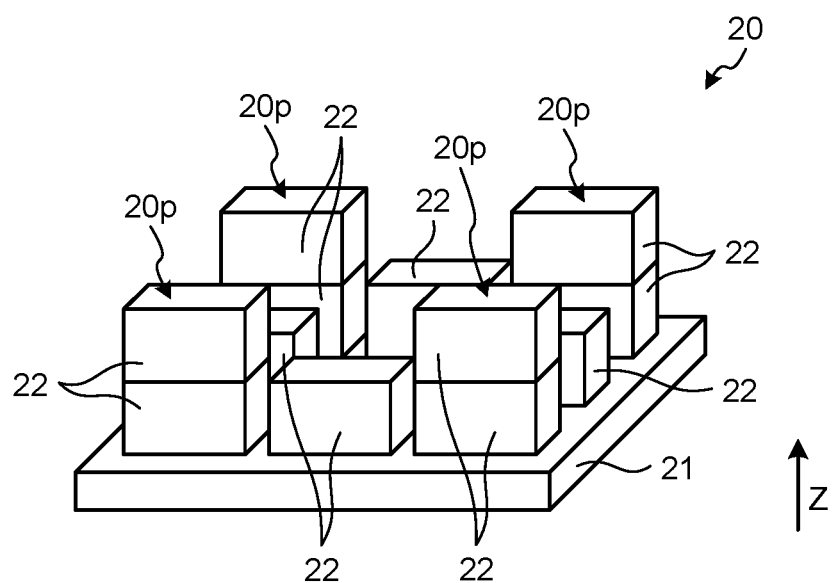
FIG. 4 is a schematic and exemplary perspective view of an article group formed by the article processing apparatus according to the embodiment.

FIG. 4 is a perspective view illustrating an example of the article group 20. As illustrated in FIG. 4, the palletizing mechanism 110 forms a plurality of columns 20$p$ of substantially the same height on the pallet 21, from a plurality of stacked articles 22. In the present embodiment, the article group 20 has at least four columns 20$p$ of the same height that are arranged near the four corners of the pallet 21, for further stable support of an upper article group 20. The article group 20 may have five or more columns 20$p$ of substantially the same height but has four columns 20$p$ arranged near the four corners of the pallet 21 (hereinafter, simply referred to as columns at the four corners). The upper end (upper surface) of each column 20$p$ is an example of the stacked portion. In addition, each column 20p may include one article 22, or may include three or more stacked articles 22.

Furthermore, as illustrated in FIG. 2, the transport unit forming apparatus 100 includes a plurality of the palletizing mechanisms 110, and the plurality of the palletizing mechanisms 110 is configured to operate in parallel. For an example, the transport unit forming apparatus 100 is provided with two reception positions Pi (Pi1, Pi2) and two palletizing positions Pp (Pp1, Pp2), and the two palletizing mechanisms 110 hold articles 22 located at different reception positions Pi1 and Pi2, move the articles 22 to predetermined positions on different pallets 21 located at different palletizing positions Pp1 and Pp2, and form different article groups 20.

Furthermore, as illustrated in FIG. 1, each of the palletizing mechanisms 110 is configured to form an article group 20, in each article group 20 so as to expose a side surface 22a of an article 22 to which identification information 22a1 is applied, from a side surface 20a of the article group 20, that is, an outer peripheral surface. The side surface 20a of the article group 20 includes side surfaces 22a of a plurality of articles 22 that is located on the outer periphery with facing sideward and outward. For the identification information 22a1, the attitude of the article 22 at the reception position Pi and the position of the side surface 22a to which the identification information 22a1 is applied in the attitude is known or constant, in some cases. In such a case, the palletizing mechanism 110 controlled by the operation control unit 163 is configured to place the article 22 so as to expose the identification information 22a1 based on the attitude, the position of the side surface 22a to which the identification information 22a1 is applied, and the position (arrangement) of the article 22 in the article group 20. Furthermore, for another example, when the palletizing mechanism 110 has a camera, when the camera is provided near the reception position Pi or the palletizing position Pp, or the like, the palletizing mechanism 110 is configured to place the article 22 so as to expose the identification information 22a1, based on a result of shooting by the camera. The identification information 22a1 represents, for example, a character, numeral, symbol, trademark, barcode, or the like. Note that the identification information 22a1 may be printed directly or the like on the side surface 22a of the article 22, or a label to which the identification information 22a1 is applied may be attached on the side surface 22a.

Note that when the article group 20 includes a plurality of the same articles 22, the palletizing mechanism 110 preferably places the plurality of the same articles 22 on a pallet 21 so that the identification information 22a1 of at least one of the plurality of the same articles 22 is exposed, and it is not necessary to show the identification information 22a1 of all the articles 22 located on the outer periphery of the article group 20.

Furthermore, the plurality of the palletizing mechanisms 110 may form different article groups 20 included in one transport unit 10. In some cases, this makes it possible to further quickly form one transport unit 10, when only the one transport unit 10 needs to be formed.

The article groups 20 formed by the palletizing mechanisms 110 are conveyed to the stacking places Ps (Ps1, Ps2) by the conveyance mechanisms 120A and 120B.

The conveyance mechanisms 120A and 120B are each configured to convey an empty pallet 21, an article group 20, a stack 20S in which a plurality of article groups 20 is stacked (see (S5) and (S6) of FIG. 5), and a formed transport unit 10, in a lateral direction. In other words, in the present embodiment, the conveyance mechanisms 120A and 120B constitute a conveyance path for the empty pallet 21, article group 20, stack 20S, and formed transport unit 10. The conveyance mechanisms 120A and 120B may also be referred to as, for example, a slide mechanism. Note that it may be said that the transport unit 10 is a completed or final stack 20S.

As illustrated in FIG. 2, the transport unit forming apparatus 100 includes three conveyance mechanisms 120A (120A1, 120A21, 120A22) that extend in an X direction and arranged in series in the X direction. Each of the conveyance mechanisms 120A extends in a substantially horizontal X direction to convey an article group 20 or pallet 21 in the X direction or a direction opposite to the X direction. The conveyance mechanism 120A22 is arranged on a side opposite to the conveyance mechanism 120A21 across the conveyance mechanism 120A1. It may be said that the conveyance mechanism 120A is divided into the three conveyance mechanisms 120A1, 120A21, and 120A22 that perform conveyance in three sections arranged in series. The conveyance mechanisms 120A1, 120A21, and 120A22 are configured to operate independently of each other. Each of the conveyance mechanisms 120A1, 120A21, and 120A22 may be further divided in series. The conveyance mechanism 120A is, for example, but is not limited to, a chain conveyor.

Furthermore, the transport unit forming apparatus 100 includes three conveyance mechanisms 120B (120B1, 120B21, 120B22) that extend in a Y direction and spaced apart in parallel in the X direction. Each of the conveyance mechanism 120B conveys a pallet 21, article group 20, or stack 20S in the Y direction or a direction opposite to the Y direction. The conveyance mechanisms 120B1, 120B21, and 120B22 are configured to operate independently of each other. The conveyance mechanism 120B is, for example, but is not limited to, a chain conveyor.

The conveyance mechanism 120A and the conveyance mechanism 120B are each configured to deliver an empty pallet 21, an article group 20, and a stack 20S.

The conveyance mechanism 120B1 that is adjacent to an intermediate position in the X direction (longitudinal direction) of the conveyance mechanism 120A1 conveys an empty pallet 21 to the intermediate position in a direction opposite to the Y direction. The conveyance mechanism 120A1 is configured to convey the empty pallet 21 received from the conveyance mechanism 120B1 to each of two palletizing positions Pp (Pp1, Pp2). Note that a pallet separation mechanism (not illustrated) may be provided to separate a plurality of stacked empty pallets 21 and take out the empty pallets 21 one by one. In this configuration, the conveyance mechanism 120B1 conveys the empty pallets 21 separated by the pallet separation mechanism toward the conveyance mechanism 120A1.

The palletizing position Pp1 is provided on the conveyance mechanism 120A21, and the palletizing position Pp2 is provided on the conveyance mechanism 120A22. As described above, the conveyance mechanisms 120A1, 120A21, and 120A22 are configured to operate independently of each other. Therefore, the conveyance mechanism 120A1 is allowed to convey an empty pallet 21 to one of the two palletizing positions Pp1 and Pp2, regardless of a forming status of an article group 20 at the other palletizing position. Furthermore, the conveyance mechanism 120A21 is allowed to convey an article group 20 formed at the palletizing position Pp1 toward the stacking place Ps1, regardless of the forming status of an article group 20 at the palletizing position Pp2, and the conveyance mechanism 120A22 is allowed to convey an article group 20 formed at the palletizing position Pp2 toward the stacking place Ps2, regardless of the forming status of an article group 20 at the palletizing position Pp1.

The conveyance mechanism 120B21 is adjacent to the conveyance mechanism 120A21, and is configured to convey an article group 20 conveyed from the palletizing position Pp by the conveyance mechanism 120A, to the stacking place Ps1 (Ps) and a shipping position Po1 (Po) in the Y direction.

Furthermore, the conveyance mechanism 120B22 is adjacent to the conveyance mechanism 120A22 on a side opposite to the conveyance mechanism 120B21 relative to the conveyance mechanism 120B1, and is configured to convey an article group 20 conveyed from the palletizing position Pp by the conveyance mechanism 120A, to the stacking place Ps2 (Ps) and a shipping position Po2 (Po) in the Y direction.

Conveyance mechanisms 120B2a with lift mechanisms may be provided at connection positions Pc between the conveyance mechanism 120A and the conveyance mechanisms 120B21 and 120B22. In this configuration, conveyance surfaces of the conveyance mechanisms 120B21 and 120B22 are set higher than conveyance surfaces of the conveyance mechanisms 120A21 and 120A22. The conveyance mechanisms 120B21 and 120B22 are configured to convey article groups 20 that are located at the connection positions Pc, lifted by the conveyance mechanisms 120B2a, and separated from the conveyance surfaces of the conveyance mechanisms 120A21 and 120A22, to the stacking places Ps. Each of the conveyance mechanisms 120B2a may also be referred to as a delivery mechanism.

FIG. 5 is a side view of the stacking mechanism 140. The stacking mechanism 140 has the conveyance mechanism 120B21 and the lift mechanism 130. Note that although stacking of article groups 20 at the stacking place Ps1 provided on the conveyance mechanism 120B21 will be described here, the stacking place Ps2 provided on the conveyance mechanism 120B22 also has similar configurations and operations of each portion.

The stacking mechanism 140 stacks a plurality of article groups 20 at the stacking place Ps1 and forms a transport unit 10. The stacking place Ps1 is a place or space where of a plurality of article groups 20 is stacked and may also be referred to as a stacking space.

At the stacking place Ps1, the lift mechanism 130 is configured to move an article group 20 or a stack 20S in which a plurality of article groups 20 is stacked, in a vertical direction. The lift mechanism 130 has a conveyor 130a, a lifter 130b, and hooks 130c.

The conveyor 130a partially constitutes the conveyance mechanism 120B21 and is configured to convey the article group 20 and the stack 20S in the Y direction and a direction opposite to the Y direction. The conveyor 130a and the conveyance mechanism 120B21 are an example of the slide mechanism.

The lifter 130b has a rail 130b1 that extends vertically, and a mover (not illustrated) that is fixed to a support portion of the conveyor 130a and is configured to move vertically along the rail 130b1 and stop at a plurality of places or any position on the rail 130b1. Moving or stopping of the mover on the rail 130b1 according to the operation of an actuator 102 (see FIG. 6) such as an electric motor makes it possible to change a vertical position of the conveyor 130a and further a vertical position of an article group 20 or stack 20S placed on the conveyor 130a. Note that it may be said that the conveyor 130a is part of the mover of the lifter 130b.

The hooks 130c are configured to hold a pallet 21, and an article group 20 including the pallet 21 may be held. Furthermore, the hooks 130c hold a pallet 21 of an article group 20 located in the lowermost layer of a stack 20S, and thus, the stack 20S may be held. The hooks 130c are each, for example, a movable claw that is configured to be moved laterally between a retracted position Pf where the hook 130c is removed from the pallet 21 and a hooking position Ph where the hook 130c hooks the pallet 21. The hook 130c may also be referred to as a fork or support.

Here, an example of the operation of the stacking mechanism 140 will be described with reference to FIG. 5.

First, the conveyance mechanism 120B21 including the conveyor 130a conveys an article group 20A to a delivery position Ps11 at the lower part of the stacking place Ps1 (Step S1).

Next, the lift mechanism 130 moves the article group 20A together with the conveyor 130a from the delivery position Ps11 to an upper position Ps12 above the delivery position Ps11. Here, the hooks 130c hold a pallet 21 of the article group 20A to secure the article group 20A at the upper position Ps12 (Step S2).

The lift mechanism 130 then moves the conveyor 130a downward (Step S3). In Step S3, the article group 20A held by the hooks 130c is secured at the upper position Ps12, and only the conveyor 130a lowers.

Next, the conveyance mechanism 120B21 including the conveyor 130a conveys a next article group 20B to the delivery position Ps11 (Step S4). The delivery position Ps11 is an example of a predetermined position.

Next, the lift mechanism 130 moves the article group 20B together with the conveyor 130a upward from the delivery position Ps11. Then, the holding of the article group 20A by the hooks 130c is released at appropriate timing before and after an upper end of the article group 20B makes contact with the pallet 21 of the article group 20A. Thus, a stack 20S in which the article group 20A is stacked on the article group 20B is formed (Step S5).

Next, the lift mechanism 130 moves the stack 20S together with the conveyor 130a to the upper position Ps12. Here, the hooks 130c hold a pallet 21 of the article group 20B located in the lowermost layer of the stack 20S, and the stack 20S is secured at the upper position Ps12 (Step S6).

Then, the stacking mechanism 140 repeats Steps S4 to S6 to stack a plurality of article groups 20, and the stack 20S and further a transport unit 10 may be formed. The conveyance mechanism 120B21 including the conveyor 130a conveys the formed transport unit 10 from the delivery position Ps11 to the shipping position Po. In the present embodiment, the shipping position Po is provided on the conveyance mechanism 120B21, on a side opposite to the conveyance mechanism 120A relative to the stacking place Ps.

In this way, the stacking mechanism 140 stacks a plurality of article groups 20 in a manner to sequentially add article groups 20 below an article group 20 positioned in the uppermost layer and forms a transport unit 10. Therefore, in the present embodiment, in the forming plan for a transport unit 10, an article 22 included in an article group 20 in an upper layer is conveyed earlier, and an article 22 included in an article group 20 in a lower layer is conveyed later.

In each stacking mechanism 140 according to the present embodiment, the conveyor 130a moves in the vertical direction, but the present disclosure is not limited to this, and for example, the conveyor 130a may not move vertically and the hooks 130c may move vertically. In this configuration, for example, the hooks 130c are releasable and have an elevation function, and the hooks 130c hold a pallet 21 of an article group 20 or a pallet 21 located in the lowermost layer of a stack 20S, at the delivery position Ps11, and rises to the upper position Ps12. Then, the hooks 130c preferably lower so as to place the holding article group 20 or stack 20S on a next article group 20 conveyed to the delivery position Ps11 by the conveyance mechanism 120B21, and release the article group 20 or stack 20S at appropriate timing. The hooks 130c having the elevation function are an example of an elevation mechanism.

Figure 6:
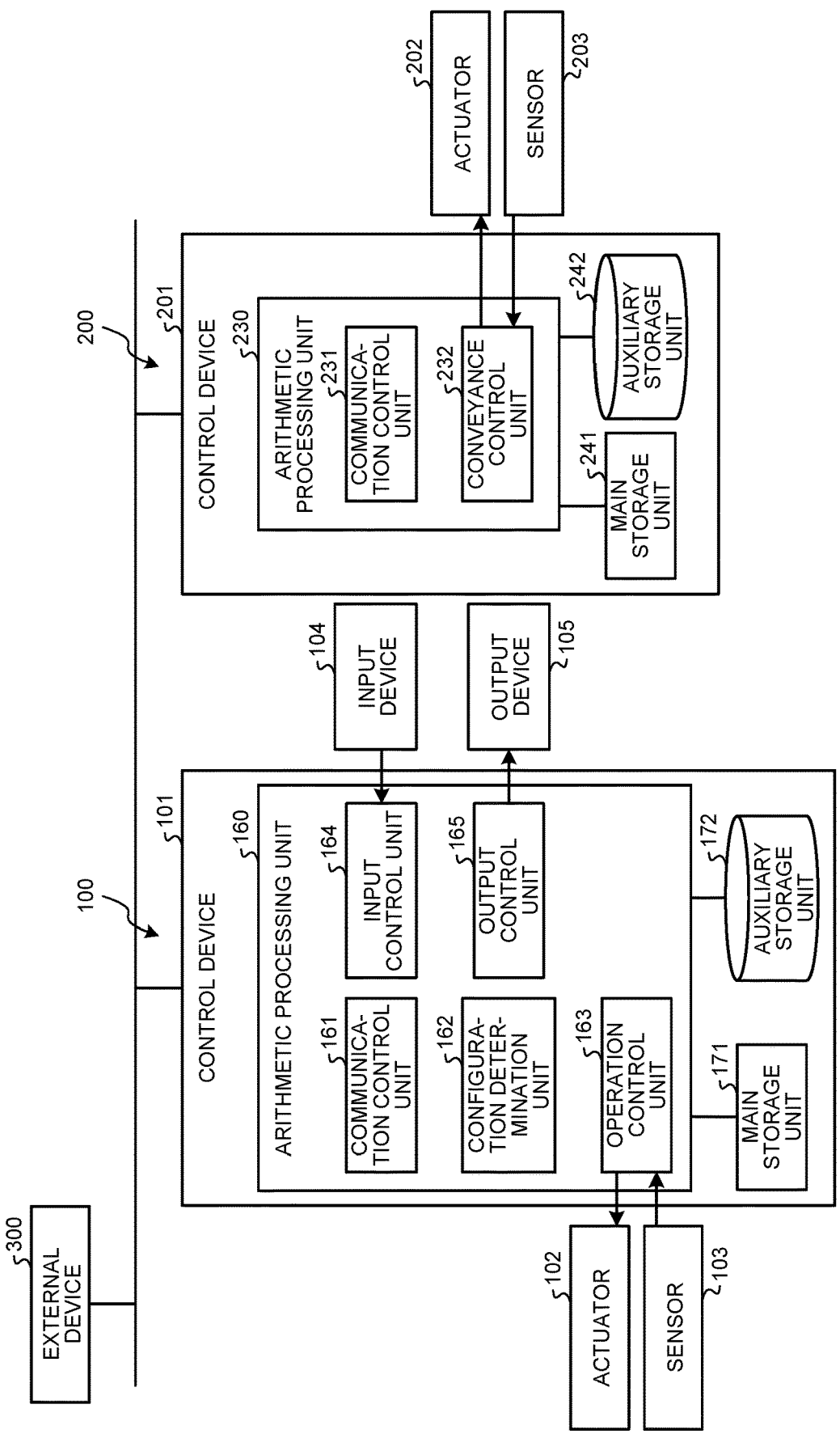
FIG. 6 is an exemplary block diagram of the article processing apparatus and an automated warehouse according to the embodiment.

FIG. 6 is a block diagram of the transport unit forming apparatus 100 and the automated warehouse 200.

The transport unit forming apparatus 100 includes a control device 101 that may be constituted by, for example, a computer. The control device 101 includes an arithmetic processing unit 160, a main storage unit 171, and an auxiliary storage unit 172.

The arithmetic processing unit 160 is, for example, a processor (circuit). The main storage unit 171 includes, for example, a random access memory (RAM) and a read only memory (ROM), and the auxiliary storage unit 172 includes, for example, a hard disk drive (HDD) or a solid state drive (SSD). The arithmetic processing unit 160 reads and executes a program (application) stored in the ROM of the main storage unit 171 or stored in the auxiliary storage unit 172. The processor operates according to a program, as a communication control unit 161, a configuration determination unit 162, the operation control unit 163, an input control unit 164, or an output control unit 165. In this case, the program includes a program module corresponding to each of the communication control unit 161, the configuration determination unit 162, the operation control unit 163, the input control unit 164, and the output control unit 165.

The program may be provided by being recorded on a computer-readable recording medium, as an installable or executable file. The recording medium may also be referred to as a program product. In addition, the program may be introduced in a computer by being downloaded from a storage unit of the computer that is connected to the communication network and stores the program, via the network. Moreover, the program may be incorporated in the ROM or the like in advance.

Furthermore, when at least part of the computer includes hardware, the computer may include, for example, a field programmable gate array (FPGA), an application specific integrated circuit (ASIC), or the like.

The ROM of the main storage unit 171 or the auxiliary storage unit 172 stores information used for arithmetic processing by the communication control unit 161, the configuration determination unit 162, the operation control unit 163, the input control unit 164, and the output control unit 165. In addition, the information used for the arithmetic processing may be described in a program.

Furthermore, the actuator 102, a sensor 103, an input device 104, and an output device 105 are electrically connected to the control device 101.

The communication control unit 161 controls transmission and reception of data to and from an external device 300 or the automated warehouse 200. The communication control unit 161 receives order information indicating a plurality of articles 22 to be carried out all together, from the external device 300. Furthermore, the communication control unit 161 transmits carry-out instruction information indicating a carry-out instruction on articles 22 to the automated warehouse 200.

The configuration determination unit 162 determines the configuration of a transport unit 10 and the configuration of an article group 20 included in the transport unit 10 by arithmetic processing on the computer. Furthermore, the configuration determination unit 162 makes a forming plan that indicates the operations of the palletizing mechanism 110, the conveyance mechanisms 120A and 120B, the lift mechanism 130, the stacking mechanism 140, and a detection mechanism 150 that form the transport unit 10 and the article group 20 whose configurations have been determined, and makes a carry-out instruction that shows the automated warehouse 200 the order, the time, and the like of carrying articles 22 out, for forming of the transport unit 10 and the article group 20 whose configurations have been determined.

In order to obtain the determined configurations of the transport unit 10 and article group 20, according to the forming plan made, the operation control unit 163, based on various detected values of the sensor 103, controls various actuators 102 of the palletizing mechanism 110, conveyance mechanisms 120A and 120B, lift mechanism 130, and stacking mechanism 140, and controls operation and arithmetic processing of the detection mechanism 150. The examples of the actuators 102 include, for example, an electric actuator, such as an electric motor, an electric hydraulic pneumatic actuator, such as an electric hydraulic pump and hydraulic pneumatic solenoid valve.

The input control unit 164 acquires information input by the input device 104, such as a touch panel, switch, button, or keyboard.

The output control unit 165 controls the output device 105 such as a display, lamp, or speaker to perform predetermined output.

Furthermore, the automated warehouse 200 includes a control device 201 that may be constituted by, for example, a computer. The control device 201 includes an arithmetic processing unit 230, a main storage unit 241, and an auxiliary storage unit 242.

The arithmetic processing unit 230 is, for example, a processor (circuit). The main storage unit 241 includes, for example, RAM and ROM, and the auxiliary storage unit 242 includes, for example, HDD or SSD. The arithmetic processing unit 230 reads and executes a program (application) stored in the ROM of the main storage unit 241 or stored in the auxiliary storage unit 242. The processor operates according to a program, as a communication control unit 231 or a conveyance control unit 232. In this case, the program includes a program module corresponding to each of the communication control unit 231 and the conveyance control unit 232.

The program may be provided by being recorded on a computer-readable recording medium, as an installable or executable file. The recording medium may also be referred to as a program product. In addition, the program may be introduced in a computer by being downloaded from a storage unit of the computer that is connected to the communication network and stores the program, via the network. Moreover, the program may be incorporated in the ROM or the like in advance.

Furthermore, when at least part of the computer includes hardware, the computer may include, for example, FPGA, ASIC, or the like.

The ROM of the main storage unit 241 or the auxiliary storage unit 242 stores information used for arithmetic processing by the communication control unit 231 and the conveyance control unit 232. In addition, the information used for the arithmetic processing may be described in a program.

Furthermore, an actuator 202 and a sensor 203 are electrically connected to the control device 201.

The communication control unit 231 controls transmission and reception of data to and from the transport unit forming apparatus 100. The communication control unit 231 receives the carry-out instruction information indicating a carry-out instruction on articles 22 from the transport unit forming apparatus 100.

In order to convey an article 22 from a storage location (not illustrated) to a reception position Pi according to the received carry-out instruction, the conveyance control unit 232 controls a stacker crane (not illustrated) and the actuator 202 of the conveyance mechanism 220, such as the conveyor 221, based on various detected values of the sensor 203. The examples of the actuators 202 include, for example, an electric actuator, such as an electric motor, an electric hydraulic pneumatic actuator, such as an electric hydraulic pump and hydraulic pneumatic solenoid valve.

Figure 7:
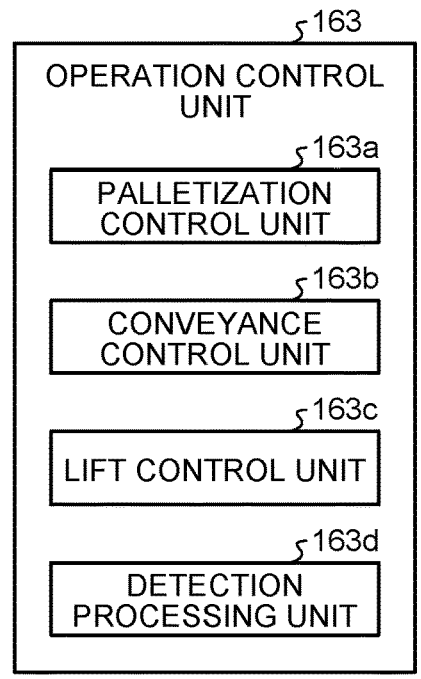
FIG. 7 is an exemplary block diagram of an operation control unit of the article processing apparatus according to the embodiment.

FIG. 7 is a block diagram of the operation control unit 163. As illustrated in FIG. 7, the operation control unit 163 includes a palletization control unit 163a, a conveyance control unit 163b, a lift control unit 163c, and a detection processing unit 163d. The palletization control unit 163a controls the palletizing mechanism 110. The conveyance control unit 163b controls the conveyance mechanisms 120A and 120B. The lift control unit 163c controls the lift mechanism 130. In addition, the detection processing unit 163d controls the operations, detection processing, and arithmetic processing of the detection mechanism 150. The stacking mechanism 140 is controlled by the conveyance control unit 163b and the lift control unit 163c. Therefore, the conveyance control unit 163b and the lift control unit 163c may also be referred to as a stacking control unit.

The detection mechanism 150 detects the height of an article group 20 formed by the palletizing mechanism 110. The detection mechanism 150 is configured to detect the heights of the article group 20 at a plurality of positions, in other words, a height distribution of the article group 20. In the present embodiment, as illustrated in FIG. 2, the detection mechanism 150 detects the heights of the article group 20, between the palletizing mechanism 110 and the stacking mechanism 140, as an example, between the palletizing position Pp and the connection position Pc.

Figure 8:
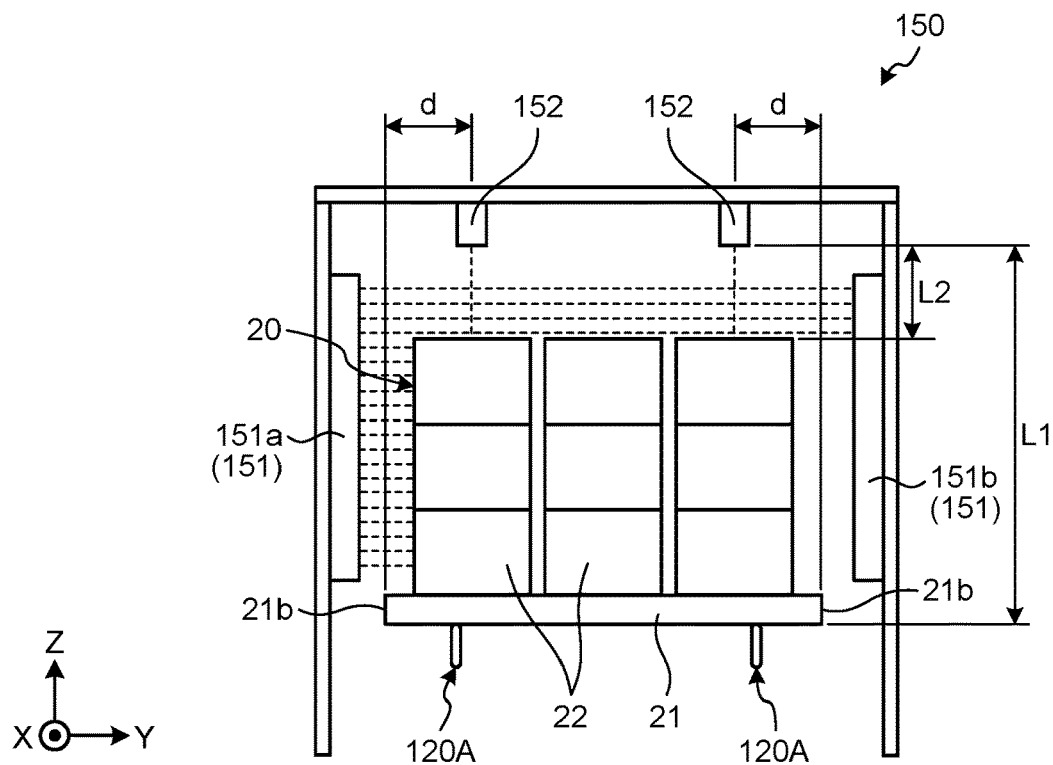
FIG. 8 is a schematic and exemplary side view of a detection mechanism of the article processing apparatus according to the embodiment.
Figure 9:
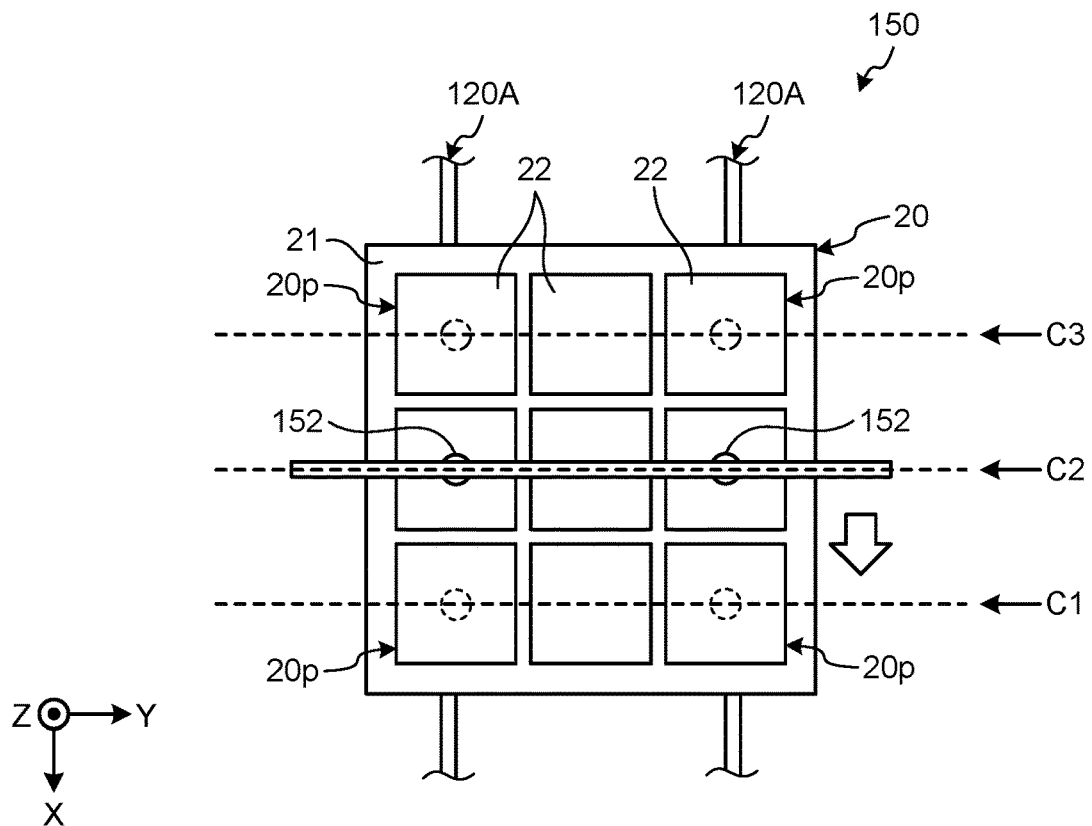
FIG. 9 is a schematic and exemplary plan view of the detection mechanism of the article processing apparatus according to the embodiment.

FIG. 8 is a side view of the detection mechanism 150, and FIG. 9 is a plan view of the detection mechanism 150. As illustrated in FIGS. 8 and 9, the detection mechanism 150 includes a sensor 151 and a plurality of sensors 152.

The sensor 151 is, for example, a through-beam sensor array. The sensor 151 includes a light emitting array 151a and a light receiving array 151b. The light emitting array 151a and the light receiving array 151b each extend vertically. Furthermore, the light emitting array 151a and the light receiving array 151b are installed so as to be separated from each other in a horizontal direction orthogonal to a conveyance direction of an article group 20 in the conveyance mechanism 120A, in other words, in a width direction (Y direction) of the conveyance mechanism 120A. The light emitting array 151a emits a plurality of signal light beams in horizontal directions at regular vertical intervals, toward the light receiving array 151b. As illustrated in FIG. 8, a signal light beam blocked by an article 22 does not reach the light receiving array 151b. Therefore, the detection processing unit 163d is allowed to acquire a height of light shielded in the light receiving array 151b, as the height of the article group 20, based on a light-receiving state of the light receiving array 151b. The sensor 151 may also be referred to as a maximum height sensor.

Conveyance of the article group 20 by the conveyance mechanism 120A makes it possible to change a relative position between the article group 20 and the sensor 151 in the conveyance direction (X direction). Therefore, the detection processing unit 163d is allowed to acquire the maximum height of an article group 20, at a plurality of positions in a cross-section (e.g., positions C1 to C3, hereinafter referred to as detection positions C1 to C3) that is perpendicular to the conveyance direction of the conveyance mechanism 120A as illustrated in FIG. 9.

The sensor 151 may repeat detection at predetermined time intervals. In this case, when detecting the front end of an article group 20 being conveyed or the front end of a column 20p thereof, the height of light shielded that is detected by the sensor 151 rapidly increases. Furthermore, when the sensor 151 detects the rear end of the article group 20 being conveyed or column 20p thereof, the height of light shielded that is detected by the sensor 151 rapidly decreases. Therefore, the detection processing unit 163d is allowed to grasp the front and rear ends of the article group 20 or the front and rear ends of a column 20p thereof, based on rising and falling of the detected value of the sensor 151 by a predetermined threshold value or more. Therefore, the detection processing unit 163d is allowed to determine the detection positions C1 to C3, for example, after moving for a predetermined distance or after a predetermined time period elapses from the time at which the front end of the article group 20 or the front end of a column 20p thereof is detected. In this case, the distance may be obtained as the product of the conveyance speed of the article group 20 by the conveyance mechanism 120A and the elapsed time period. Furthermore, for example, the detected values of the sensor 151 may be stored in the main storage unit 171 or the auxiliary storage unit 172 for a certain period of time so that the detection positions C1 to C3 may be determined before moving for a predetermined distance or before a predetermined time period elapses from the time at which the rear end of the article group 20 or the rear end of a column 20p thereof is detected. Furthermore, for example, the detected values of the sensor 151 may be stored in the main storage unit 171 or the auxiliary storage unit 172 for a predetermined period of time so that a detection section from the front end to the rear end of the article group 20 is determined based on a change with time in the detected values and the detection positions C1 to C3 are determined in the detection section.

Each of the sensors 152 is, for example, a non-contact distance sensor such as a laser range finder. In this configuration, the sensor 152 is installed, for example, at a position above the conveyance mechanism 120A as illustrated in FIG. 8 and detects a distance L2 from the installation position to the upper end of the article group 20. The detection processing unit 163d is configured to acquire the height of the article group 20 as a difference (L1−L2) between a distance L1 from a mounting surface of the conveyance mechanism 120A to the sensor 152 and the detected distance L2. In the present embodiment, for an example, the detection mechanism 150 has two sensors 152 but may have three or more sensors 152 that are separated from each other in the width direction of the conveyance mechanism 120A. The sensor 152 may also be referred to as a local height sensor.

Conveyance of the article group 20 by the conveyance mechanism 120A makes it possible to change a relative position between the article group 20 and the sensor 152 in the conveyance direction (X direction). Therefore, the detection processing unit 163d is allowed to acquire the height of an article group 20 below the position of the sensor 152, in a plurality of cross-sections (e.g., the detection positions C1 to C3) that is perpendicular to the conveyance direction of the conveyance mechanism 120A as illustrated in FIG. 9.

Here, as illustrated in FIGS. 8 and 9, each of the sensors 152 is located above a position inward in a width direction by a predetermined distance d from an end portion 21b in a width direction of the pallet 21 that is assumed to be positioned at the center in a width direction of the conveyance mechanism 120A. The predetermined distance d is, for example, about half the width of a typical article 22 processed in the transport unit forming apparatus 100. This makes it possible for the sensors 152 to be positioned relatively above the columns 20p at the four corners of the article group 20 in the conveyance of the article group 20. Therefore, the detection processing unit 163d is allowed to acquire the heights of the columns 20p at the four corners of the article group 20, based on the detected values of the sensors 152 at the detection positions C1 and C3. Note that with three or more sensors 152, local heights of the article group 20 may be acquired at more positions. Note that the detection mechanism 150 is not limited to the configurations illustrated in FIGS. 8 and 9.

When any error occurs in the palletizing mechanism 110, a detected value of the height of an article group 20 detected by the detection mechanism 150 does not satisfy a predetermined condition. In such a case, in the present embodiment, the conveyance mechanism 120A as an exclusion mechanism excludes the article group 20 from a target for stacking in the stacking place Ps. In this case, the operation control unit 163 controls the conveyance mechanism 120A to convey the article group 20 that does not satisfy the predetermined condition, to an exclusion position Pe different from the stacking place Ps. The exclusion position Pe is located at both longitudinal ends of the conveyance mechanism 120A. Therefore, in the present embodiment, the conveyance path for the article group 20 from the palletizing position Pp is divided into a conveyance path for the article group 20 that extends from the connection position Pc between the conveyance mechanism 120A and the conveyance mechanism 120B to the stacking place Ps, and a conveyance path for the article group 20 that extends to the exclusion position Pe. Furthermore, the conveyance mechanism 120A is shared between the conveyance from the palletizing position Pp for the article group 20 to the stacking place Ps and the conveyance from the palletizing position Pp for the article group 20 to the exclusion position Pe.

In the exclusion position Pe, for example, a worker or the like is allowed to make an adjustment such as reloading the articles 22 for the excluded article group 20 that does not satisfy the condition. Therefore, the exclusion position Pe is set away from the palletizing mechanism 110 and the stacking mechanism 140 so that an operator will not be affected by the palletizing mechanism 110 and the stacking mechanism 140. Note that the exclusion position Pe is set at both longitudinal ends of the conveyance mechanism 120A but may be set only at one longitudinal end.

Here, the conditions for excluding the article group 20 from the target for stacking will be described. An article group 20 that satisfies at least one of the following exclusion conditions (1-1) and (1-2) is excluded from the target for stacking.

Figure 10:
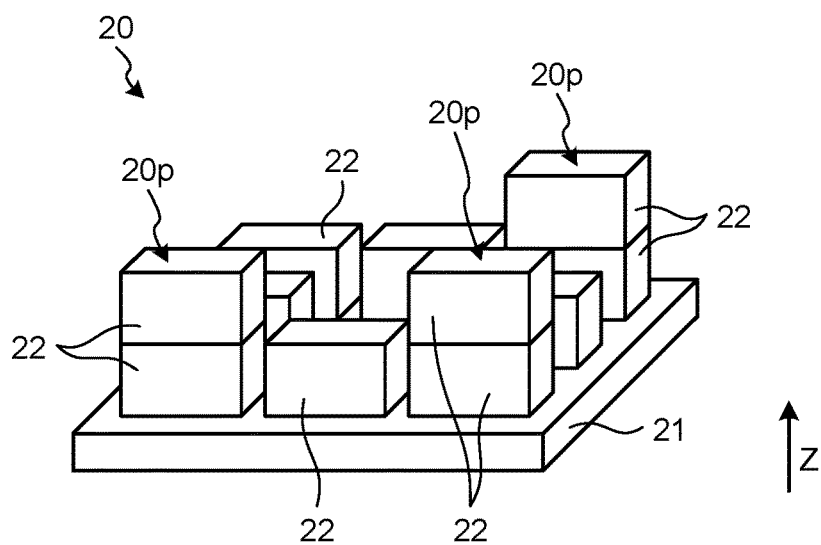
FIG. 10 is a schematic and exemplary perspective view of an article group formed by the article processing apparatus according to the embodiment, illustrating an example of an article group excluded from a target for stacking.

(1-1) In a case where the maximum difference in height between the columns 20p at the four corners exceeds a first threshold value FIG. 10 is a perspective view of an article group 20 having three columns 20p arranged near three corners but not having a column 20p arranged near one corner. As illustrated in FIG. 10, if even one of the columns 20p at the four corners is missing, there is a possibility that another pallet 21, that is, another article group 20 may not be stably placed on this article group 20. Furthermore, when the columns 20p at the four corners have a large difference in height, there is also a possibility that another article group 20 may not be stably placed on this article group 20, even if the four corners have the columns 20p. Therefore, the operation control unit 163 excludes an article group 20 that meets the condition (1-1) from the target for stacking. The condition (1-1) may be determined based on detected values of the sensors 152 at the detection positions C1 and C3. Specifically, when the maximum value (maximum difference) of or at least one of the absolute values of differences between heights h1 to h4 (|h1−h2|, |h1−h3|, |h1−h4|, |h2−h3|, |h2−h4|, and |h3−h4|) of the columns 20p at the four corners is equal to or larger than a third threshold value Th3 (e.g., 10 mm), this article group 20 is excluded from the target for stacking. The heights h1 to h4 are acquired from the detected values of the two sensors 152 at the detection position C1 and the detected values of the two sensors 152 at the detection position C3.

Figure 11:
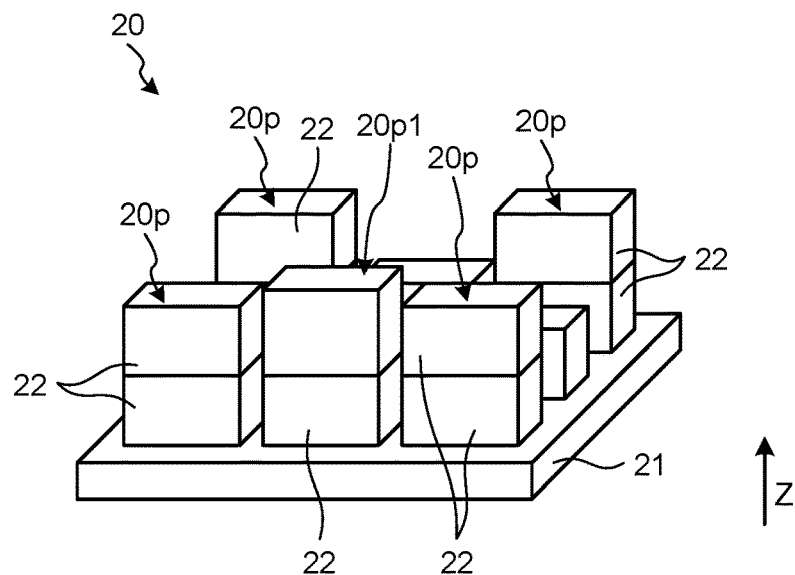
FIG. 11 is a schematic and exemplary perspective view of an article group formed by the article processing apparatus according to the embodiment, illustrating another example of an article group excluded from a target for stacking.

(1-2) In a case where the height of another column 20p1 different from columns 20p at the four corners is higher than the columns 20p at the four corners, and the maximum difference between the height of this another column 20p1 and the heights of the columns 20p at the four corners exceeds a second threshold value FIG. 11 is a perspective view of an article group 20 in which another column 20p1 different from columns 20p at the four corners is higher than the columns 20p at the four corners. As illustrated in FIG. 11, when the another column 20p1 protrudes higher than the columns 20p at the four corners, another article group 20 may not be stably placed on this article group 20. Therefore, the operation control unit 163 excludes an article group 20 that meets the condition (1-2) from the target for stacking. In the case of FIG. 11, a maximum height hmax of the article group 20 obtained from the detected values of the sensor 151 at the detection positions C1 to C3 is large. Therefore, for the condition (1-2), when the maximum height hmax of the article group 20 is higher than all the heights h1 to h4 of columns 20p at the four corners that are obtained from the detected values of the sensors 152, and the maximum value (maximum difference) of or at least one of differences between the maximum height hmax and the heights h1 to h4 of the columns 20p at the four corners ((hmax−h1), (hmax−h2), (hmax−h3), and (hmax−h4)) is equal to or larger than a fourth threshold value Th4 (e.g., 10 mm), this article group 20 is excluded from the target for stacking.

In the present embodiment, the configuration determination unit 162 determines the configurations of an article group 20 and a transport unit 10, based on the order information that specifies, for example, articles 22 to be transported together, and makes a forming plan and carry-out instruction for forming of the transport unit 10. As described above, in order to convey an article 22 from a storage location (not illustrated) of the automated warehouse 200 to a reception position Pi according to the carry-out instruction made, the conveyance control unit 232 of the automated warehouse 200 controls the stacker crane (not illustrated) and the actuator 202 of the conveyance mechanism 220, such as the conveyor 221. Furthermore, in order to form the article group 20 and the transport unit 10, according to the forming plan made, the operation control unit 163 controls the actuators 102 of the palletizing mechanism 110, conveyance mechanisms 120A and 120B, lift mechanism 130, and stacking mechanism 140, and controls operation and arithmetic processing of the detection mechanism 150.

Figure 12:
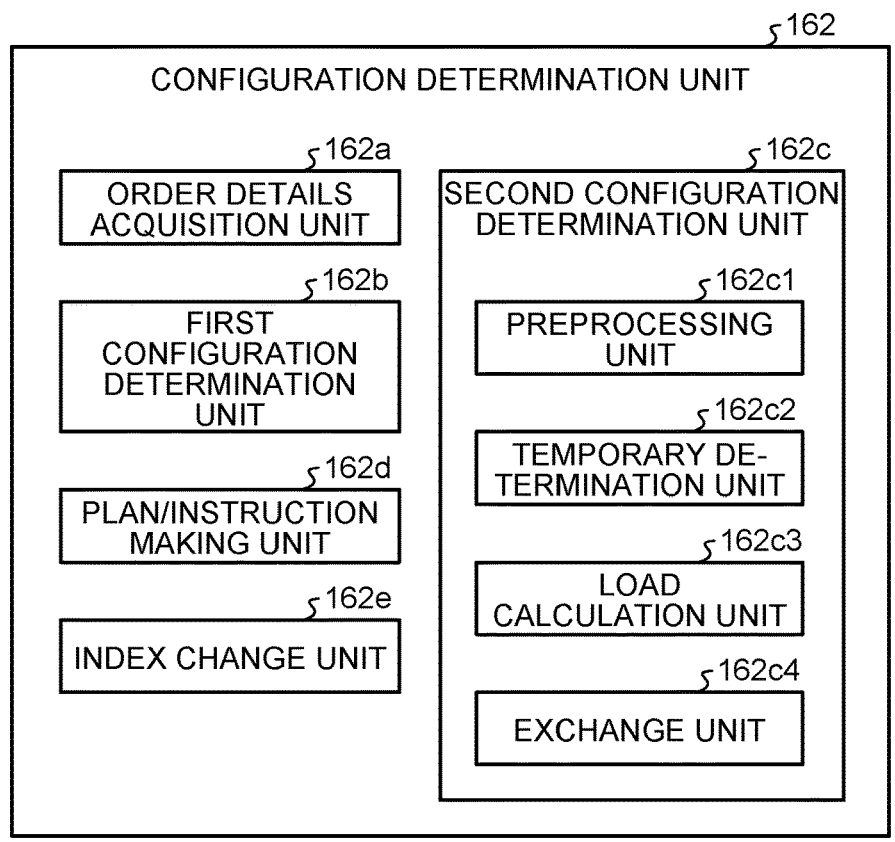
FIG. 12 is an exemplary block diagram of a configuration determination unit of the article processing apparatus according to the embodiment.

FIG. 12 is a block diagram of the configuration determination unit 162. As illustrated in FIG. 12, the configuration determination unit 162 has an order details acquisition unit 162a, a first configuration determination unit 162b, a second configuration determination unit 162c, a plan/instruction making unit 162d, and an index change unit 162e.

The order details acquisition unit 162a acquires the contents of order from the external device 300, such as the identification information or quantity of an article 22 to be included in a transport unit 10, the identification information of a conveyance destination, the time of conveyance, and the like.

The first configuration determination unit 162b determines the configuration of an article group 20 to be included in the transport unit 10. A procedure for determining the configuration of the article group 20 will be described later.

The second configuration determination unit 162c determines a combination and arrangement of the article groups 20 whose configurations have been determined and thereby determines the configuration of the transport unit 10. The second configuration determination unit 162c has a preprocessing unit 162c1, a temporary determination unit 162c2, a load calculation unit 162c3, and an exchange unit 162c4. The preprocessing unit 162c1 performs calculation of each parameter necessary for determining the configuration of the transport unit 10. The temporary determination unit 162c2 temporarily determines the configuration of the transport unit 10. The load calculation unit 162c3 calculates a load acting on an article 22 and checks whether the load is larger than the load index of the article group 20. The exchange unit 162c4 exchanges the arrangement of article groups 20 as necessary according to results of the calculation and check by the load calculation unit 162c3. The procedure for determining the configuration of the transport unit 10 will be described later.

The plan/instruction making unit 162d forms a forming plan for more smoothly and more reliably forming the transport unit 10 determined by the second configuration determination unit 162c.

The index change unit 162e is configured to change the load index. The load index and changing the load index will be described later in detail.

Figure 13:
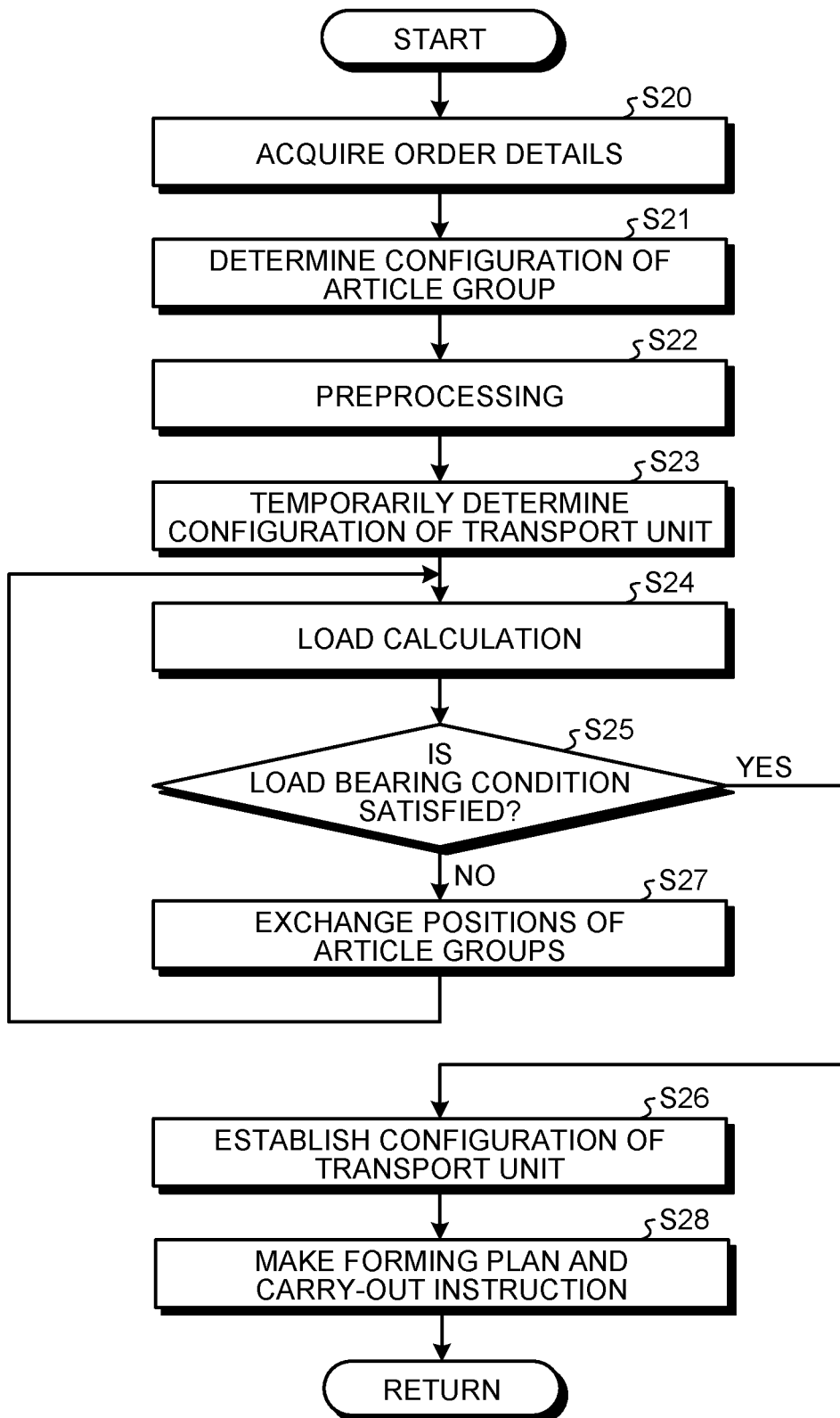
FIG. 13 is a flowchart illustrating an example of a procedure of determining a configuration of a transport unit by the configuration determination unit of the article processing apparatus according to the embodiment.

FIG. 13 is a flowchart illustrating a procedure for determining the configuration of a transport unit 10. As illustrated in FIG. 13, the configuration determination unit 162 operates as the order details acquisition unit 162a first and acquires the contents of order from order information (Step S20).

Next, the configuration determination unit 162 operates as the first configuration determination unit 162b and determines the configuration of an article group 20 so as to be indicated by the contents of the order acquired in Step S20 and to satisfy a predetermined rule or condition according to (Step S21).

In determining the configuration of the article group 20, the first configuration determination unit 162b acquires attribute information, such as the size, weight, load bearing, and load index of a pallet 21 or each article 22, for example, from a database stored in the auxiliary storage unit 172. Note that the database may be stored in a server different from the transport unit forming apparatus 100. In this configuration, the first configuration determination unit 162b acquires the attribute information of the pallet 21 or each article 22 via the communication control unit 161.

When there is an instruction or designation in the order information, the first configuration determination unit 162b determines the configuration of the article group 20 according to the instruction. For example, when the type and quantity of articles 22 constituting the article group 20 are specified in advance, the first configuration determination unit 162b determines the configuration of the article group 20 so as to include the articles 22 of the specified type and quantity. Furthermore, for example, when the height and weight of each article group 20 are specified, the first configuration determination unit 162b determines the configuration of each article group 20 so as to satisfy the conditions of specified height and weight.

When the article group 20 is configured as the first article group on which another pallet 21, that is, another article group 20 is placed, the first configuration determination unit 162b determines the configuration of the article group 20 so that the article group 20 has columns 20p at the four corners, as described above. The article group 20 may have a column 20p having the same height as the columns 20p at the four corners, or may have articles 22 stacked to have a height lower than the columns 20p at the four corners.

Furthermore, for example, when the article group 20 that is the first article group is configured as the third article group including only a plurality of products of the same brand but different specifications as described above, when the article group 20 includes a plurality of articles 22 of the same shape but different brands and specifications, or when the article group 20 includes only a plurality of articles 22 having the same height and stackable on each other, the first configuration determination unit 162b constitutes the article group 20 according to a logic as described below.

In other words, when a plurality of articles 22 may be arranged in a matrix of n rows and m columns (n and m are a positive integer) on the pallet 21, one article 22 or a plurality of stacked articles 22 is arranged at each position of the matrix shape. In this configuration, the first configuration determination unit 162b determines the number i of stacks (i is a positive integer) of articles 22 to be stacked in the columns 20p at the four corners for an article group 20 in which the number of articles 22 is N (N is an integer of 4 or more), according to the following formula (1).

$$i = (N-1)/(n \times m) + 1 \quad (1)$$

However, the number i of stacks is a positive integer, and the result is rounded down to the nearest whole number in the calculation of i according to formula (1). FIG. 4 illustrates the article group 20 that has 12 articles 22 in a case where the articles 22 of the same shape may be arranged in a planar matrix of three rows and three columns on the pallet 21. In this configuration, n=3, m=3, and N=12, and formula (1) is i=(12−1)/(3×3)+1=2.22→i=2 (rounded down to the closest integer), and thereby the number i of stacks of the articles 22 in the columns 20p at the four corners is 2, as illustrated in FIG. 4. Likewise, when articles 22 are stacked in a matrix of three rows and three columns, N: 4-9→i=1
N: 10-18→i=2
N: 19-27→i=3 are obtained. As illustrated in FIG. 4, in a case where the number i of stacks is 2 or more, after the number of stacks of articles 22 of 2 is secured in the columns 20p at the four corners, the arrangement of the articles 22 is determined around the columns 20p at the four corners so as to balance in the X direction or Y direction as much as possible, having a height not exceeding the columns 20p at the four corners.

In the case of FIG. 4, the remaining four articles 22 obtained by excluding eight articles 22 constituting the columns 20*p* at the four corners from a total of 12 articles 22 are arranged in four spaces between the columns 20*p* at the four corners, thereby balancing in the X direction and the Y direction. The number i of stacks of the articles 22 in the columns 20*p* at the four corners may also be referred to as a maximum number of stacks of the articles 22 in the article group 20. Note that the layouts of articles 22 depending on the number N of the articles 22 may be stored in the auxiliary storage unit 172. In addition, when the number of articles 22 included in the article group 20 is three or less, the columns 20*p* at the four corners may not be formed, and therefore, the first article group on which another pallet 21, that is, another article group 20 is placed is not configured only by the three or less articles 22.

Next, the configuration determination unit 162 operates as the preprocessing unit 162*c*1 of the second configuration determination unit 162*c* and calculates parameters necessary for determining the configuration of a transport unit 10 (Step S22). In Step S22, the preprocessing unit 162*c*1 acquires a total value of the heights of the plurality of article groups 20 and determines the number of transport units 10 based on the total value of the heights. Here, in a case where the height of a transport unit 10 is limited, the heights of all the transport units 10 need to be within a limited height Hmax. For an example, when the limited height is Hmax and the total value of the heights of a plurality of article groups 20 is Ht, the preprocessing unit 162*c*1 determines the number I of the transport units 10 (I is an integer of 1 or more) according to the following formula (2).

$$I = Ht/H\max + 1 \quad (2)$$

However, the number i of stacks is a positive integer, and the result is rounded down to the nearest whole number in the calculation of I according to formula (2). The limited height Hmax is an example of a defined height.

Figure 14:
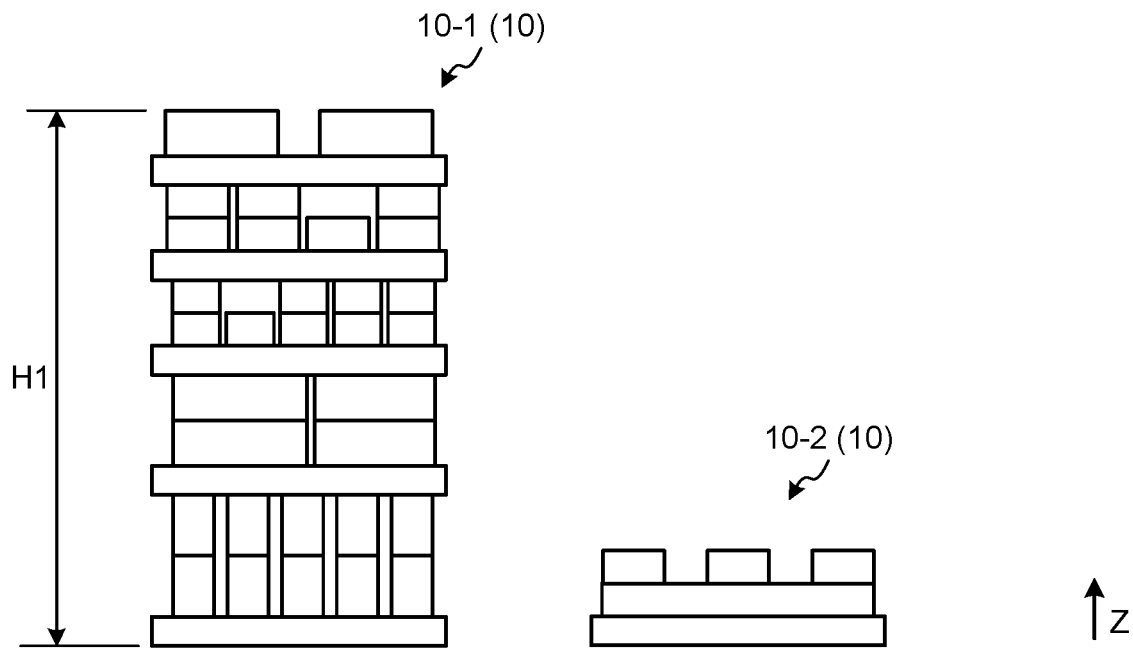
FIG. 14 is a schematic and exemplary side view of transport units formed by the article processing apparatus according to the embodiment, illustrating forming transport units having heights closer to a defined height.
Figure 15:
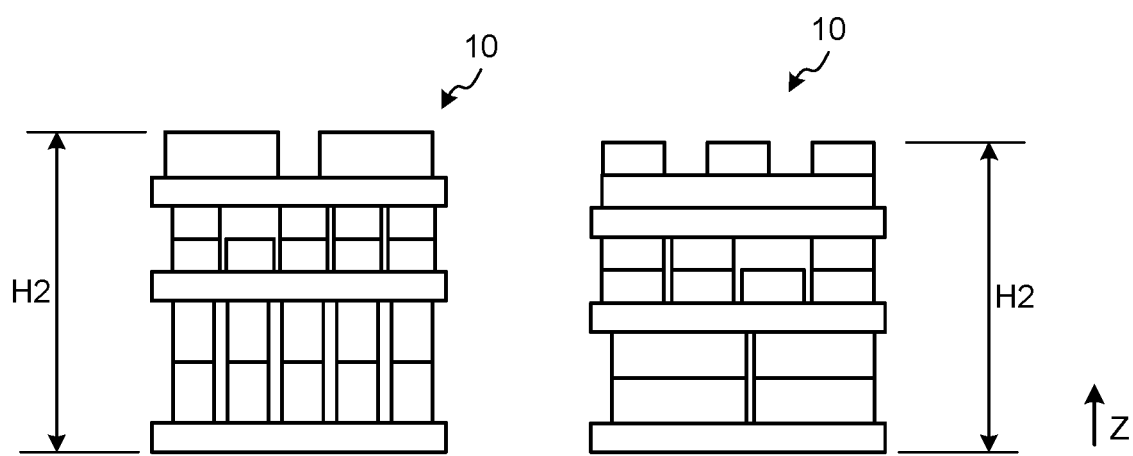
FIG. 15 is a schematic and exemplary side view of transport units formed by the article processing apparatus according to the embodiment, illustrating forming a plurality of transport units having an equalized height.

Furthermore, in Step S22, the preprocessing unit 162*c*1 determines a target height of the transport unit 10. In formula (2), in a case of determination of the configuration of the transport units 10 the number I of which is 2 or more, that is, in a case of determination of a plurality of the transport units 10, the configuration, in some cases, includes:

(2-1) a transport unit 10 that has a height closer to the limited height Hmax; and (2-2) the plurality of the transport units 10 that has an equal height. FIG. 14 is a side view illustrating a configuration example of the plurality of transport units 10 in the case of (2-1), and FIG. 15 is a side view illustrating a configuration example of the plurality of transport units 10 in the case of (2-2).

In the case of (2-1), the second configuration determination unit 162*c* determines the configuration of a transport unit 10-1 in Steps S22 to S25 to have a deviation (first deviation) between a height H1 of the transport unit 10-1 and the limited height Hmax (not illustrated) that is equal to or less than a first threshold value Th1 in both of temporary determination of and exchange between the transport units 10, which are described later. Note that the height of a transport unit 10-2 is preferably has a height equal to or less than the limited height Hmax. This makes it possible to advantageously readily increase loading efficiency in a transport space, for example, upon transport of a plurality of transport units 10 by truck or the like. Note that the transport unit 10-2 having a height lower than the limited height Hmax may be stacked together with another transport unit 10. In a case where the number of the transport units 10 is I (I is an integer of 2 or more), the second configuration determination unit 162*c* determines the configuration of the transport unit 10-1 so that the absolute value of the first deviation of each of I−1 transport units 10 is equal to or less than the first threshold value Th1. Note that the first threshold value Th1 is set relatively loosely, for example, set to approximately 10 to 20% of the limited height Hmax.

On the other hand, in the case of (2-2), the second configuration determination unit 162*c* determines the configuration of the plurality of transport units 10 in Steps S22 to S25 so that the heights H2 of the plurality of transport units 10 have similar values that are closer to each other, in both of temporary determination of and exchange between the transport units 10. Specifically, the configuration of the plurality of transport units 10 is determined so that a value obtained by dividing the total height Ht by the number I of the transport units 10 is defined as an average height Hm, and the absolute value of a deviation (second deviation) between the heights of all the transport units 10 and Hm is equal to or less than a second threshold value Th2. This makes it possible to advantageously readily balance the weight, for example, upon transport of the plurality of transport units 10 by truck or the like. Note that the second threshold value Th2 is set relatively loosely, for example, set to approximately 10 to 20% of the average value Hm.

Furthermore, in Step S22, the preprocessing unit 162*c*1 calculates the load indices of the article groups 20.

The load bearing of each article group 20 increases as the load bearing of articles 22 constituting each column 20*p* increases. Furthermore, the load bearing of each article group 20 increases as the number of columns 20*p* provided in the article group 20 increases.

However, in a case where a plurality of articles 22 is stacked in each column 20*p*, there is also a possibility that the load bearing is reduced due to, for example, an error or variation in the shape of each article 22, or displacement of the plurality of articles 22. Therefore, in the present embodiment, a reduction coefficient is set to decrease as the number i of stacks of the articles 22 in each column 20*p* increases. For an example, in a case where the number i of stacks is 1, the reduction coefficient is set to 100% (1.0), in a case where the number i of stacks is 2, the reduction coefficient is 60% (0.6), and in a case where the number i of stacks is 3, the reduction coefficient is set to 40% (0.4). Even when the number i of stacks is 4 or more as well, the reduction coefficient is set to decrease as the number i of stacks increases.

The preprocessing unit 162*c*1 calculates a load index Iw for each article group 20 according to the following formula (3).

$$Iw = r \times W \times Np \quad (3)$$

Here, r is the reduction coefficient, W is the load bearing of an article 22, and Np is the number of columns 20*p*. The load index Iw decreases as the number i of stacks increases. The number i of stacks is the number of stacks of articles 22 between a pallet 21 and another pallet 21, and may also be referred to as the number of stages.

For an example, in the article group 20 illustrated in FIG. 4, when r=0.6 (the number i of stacks=2), the load bearing W of an article 22 is 50 [kg], and the number Np of columns 20*p* is 4, the load index Iw of the article group 20 is represented by the following formula.

$$Iw = 0.6 \times 50 \times 4 = 120 \ [kg]$$

Furthermore, in Step S22, the preprocessing unit 162*c*1 calculates the weight of each article group 20. The weight of the article group 20 is a total value of the weights of a pallet 21 and a plurality of articles 22 that are included in the article group 20.

Next, the configuration determination unit 162 operates as the temporary determination unit 162c of the second configuration determination unit 162c and temporarily determines the configuration of a transport unit 10 (Step S23). In Step S23, when the configuration of a plurality of transport units 10 is temporarily determined, the temporary determination unit 162c2 distributes one by one, for example, a plurality of article groups 20, for each of the plurality of transport units 10 in descending order of weight. Furthermore, in each transport unit 10, the temporary determination unit 162c2 arranges an article group 20 having a larger weight on the lower side and arranges an article group 20 having a smaller weight on the upper side. This makes it possible to advantageously suppress shaking of and further collapse of the transport unit 10, due to the center of gravity of the transport unit 10 that is positioned on the lower side.

Figure 16:
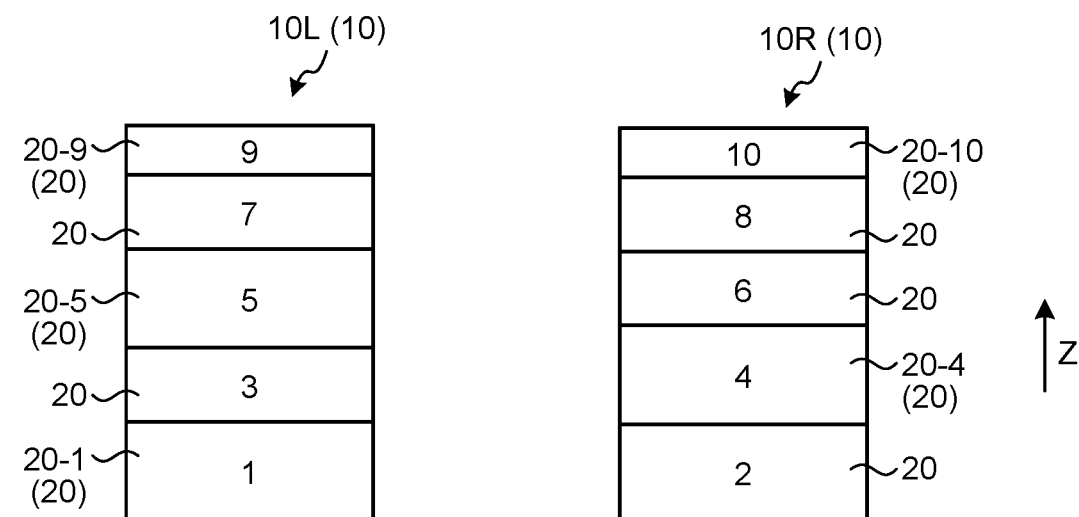
FIG. 16 is an exemplary schematic diagram illustrating the configurations of transport units temporarily determined by the article processing apparatus according to the embodiment.

FIG. 16 is a schematic diagram (side view) illustrating an example of temporary determination of two transport units 10. In FIG. 16 (and FIGS. 17 and 18), for the sake of simplicity, ten article groups 20 are illustrated as simple rectangles. The numerals applied to the respective rectangles are numerals for distinction of the article groups 20 and indicate that as the number increases from 1 to 10, the weight decreases. Furthermore, the height of each rectangle indicates the height of each article group 20. In the following description, an article group 20 to which a number j (j=1 to 10) is assigned is referred to as the j-th article group 20-j.

Note that such a temporary determination is an example, and the temporary determination unit 162c2 may distribute, for example, the article groups 20 in descending order of the load index Iw instead of distributing the article groups 20 in descending order of weight. In this case, in each transport unit 10, the temporary determination unit 162c2 arranges an article group 20 having a larger load index Iw on the lower side and arranges an article group 20 having a smaller load index Iw on the upper side.

Furthermore, in Step S23, the temporary determination unit 162c2 temporarily determines the plurality of transport units 10 so that the height of each transport unit 10 is within the target height. In other words, the temporary determination unit 162c2 temporarily determines the arrangement of the plurality of article groups 20 on the condition (height condition) that the heights of the transport units 10 are within the target height.

Next, the configuration determination unit 162 operates as the load calculation unit 162c3 of the second configuration determination unit 162c and makes a load calculation (Step S24). In Step S24, the load calculation unit 162c3 compares the load index Iw of each article group 20 with the weight of an article group 20 placed on the article group 20.

If a load bearing condition is satisfied in all the article groups 20, that is, if the load index Iw of each article group 20 is larger than the weight of an article group 20 placed on the article group 20 (Yes in Step S25), the second configuration determination unit 162c establishes the configuration of each transport unit 10, that is, the configuration and arrangement of the article groups 20 in each transport unit 10 (Step S26).

If the configuration of each transport unit 10 is established in Step S26, the configuration determination unit 162 operates as a plan/instruction making unit 162d and makes a forming plan for the transport unit 10, the configuration of which is determined, and a carry-out instruction for the plurality of articles 22 for forming of the transport unit 10 (Step S28).

Meanwhile, in Step S25, if at least one article group 20 has a load index Iw that is equal to or less than the weight of the article group 20 placed on the article group (No in Step S25), the configuration determination unit 162 operates as the exchange unit 162c4 of the second configuration determination unit 162c, and exchanges the positions of the two article groups 20 (Step S27). In this Step S27, the exchange unit 162c4 exchanges article groups 20, for example, according to a logic of (3-1) or (3-2) described below.

(3-1) An article group 20 that does not satisfy the load bearing condition is exchanged with an article group 20 having a higher load index Iw.

Figure 17:
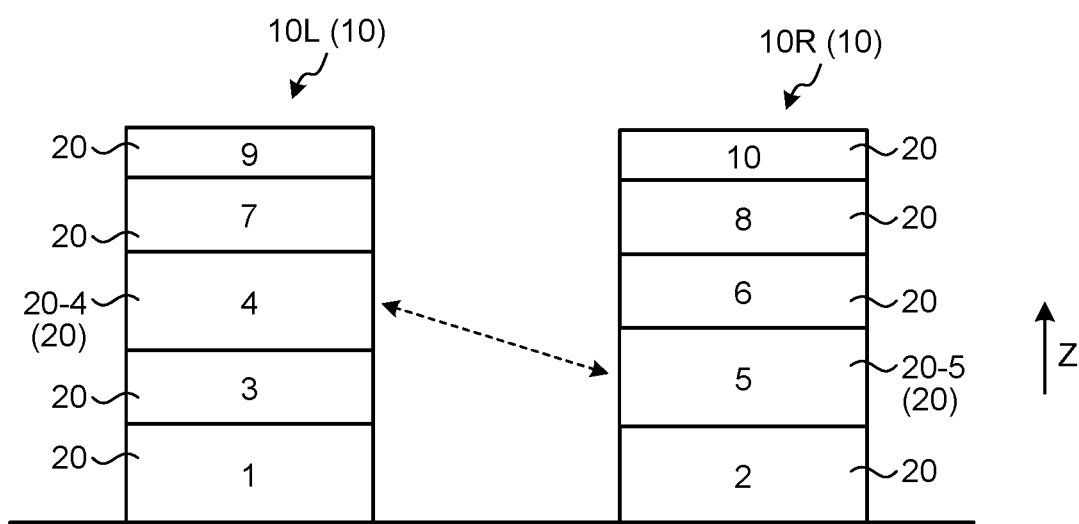
FIG. 17 is an exemplary schematic diagram illustrating an example of the configurations of transport units in which article groups have been exchanged after the temporary determination by the article processing apparatus according to the embodiment.

Here, for an example, it is assumed that an article group 20-5 having the fifth largest load index Iw does not satisfy the load bearing condition, in a transport unit 10L (10) on the left side of FIG. 16. Furthermore, here, it is assumed that the load index Iw of the fourth article group 20-4 is larger than the load index Iw of the fifth article group 20-5, in FIG. 16 FIG. 17 is a schematic diagram (side view) of the transport units 10 in which the article groups 20 have been exchanged after temporary determination of the transport units 10 of FIG. 16 in this case. As is clear from a comparison between FIGS. 16 and 17, in the example of FIG. 17, the fourth article group 20-4 and the fifth article group 20-5 have been exchanged in the two transport units 10 of FIG. 16. In such exchange, the article group 20-4 having a larger load index Iw is put in place of the article group 20-5 that does not satisfy the load bearing condition, and thus, it is possible to satisfy the load bearing condition.

(3-2) An article group 20 placed on an article group 20 that does not satisfy the load bearing condition is exchanged with another article group 20 having a smaller weight.

Figure 18:
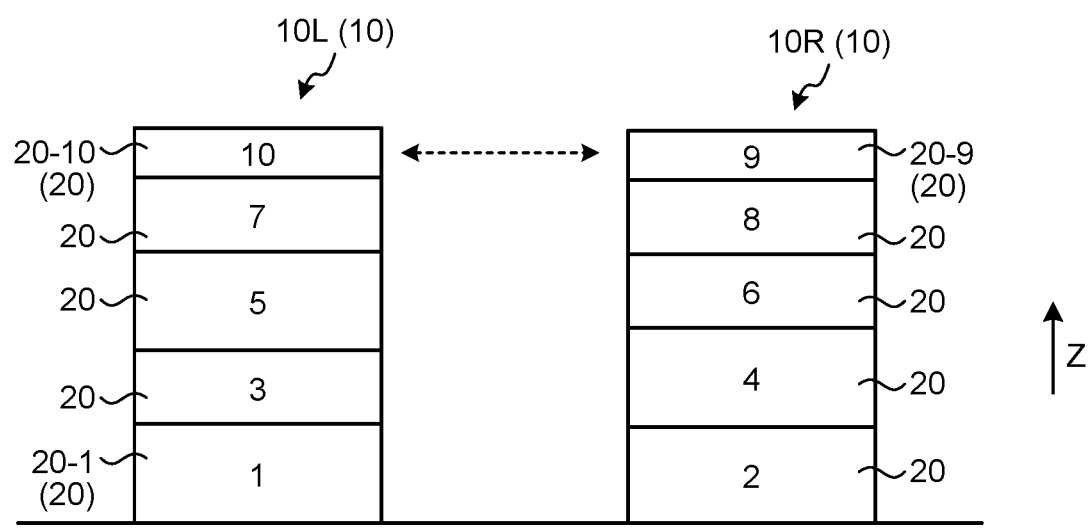
FIG. 18 is an exemplary schematic diagram illustrating another example of the configurations of transport units in which article groups have been exchanged after the temporary determination by the article processing apparatus according to the embodiment.

Here, for an example, it is assumed that an article group 20-1 having the largest load index Iw does not satisfy the load bearing condition, in the transport unit 10L (10) on the left side of FIG. 16. FIG. 18 is a schematic diagram (side view) of the transport units 10 in which the article groups 20 have been exchanged after temporary determination of the transport units 10 of FIG. 16. As is clear from a comparison between FIGS. 16 and 18, in the example of FIG. 18, the ninth article group 20-9 and the tenth article group 20-10 have been exchanged in the two transport units 10 of FIG. 16. Here, the weight of the tenth article group 20-10 is smaller than the weight of the ninth article group 20-9. Therefore, in such exchange, the weight of the other article groups 20 placed above the article group 20-1 that does not satisfy the load bearing condition are reduced, and thus, it is possible to satisfy the load bearing condition.

In Step S27, as described above, the exchange unit 162c4 exchanges the plurality of article groups 20 so that the height of each transport unit 10 is within the target height. In other words, in Step S27, the exchange unit 162c4 selects two article groups 20 to be exchanged with each other on the condition (height condition) that the heights of the transport units 10 are within the target height. Furthermore, after Step S27, Step S24 is performed to check the load bearing condition for the exchanged configurations. Note that in the above example, the positions of the article groups 20 are exchanged between the plurality of temporarily determined transport units 10, but the present disclosure is not limited to this, and the positions of article groups 20 may be exchanged in the same transport unit 10.

In a case where even various combinations of article groups 20 to be exchanged with each other may not satisfy the load bearing condition and the height condition for all article groups 20, the second configuration determination unit 162c may, for example, increase the number of transport units 10, set the target height lower, or set the first threshold value or the second threshold value larger, and then perform Step S22 and subsequent steps again.

Furthermore, the load index Iw used for the load calculation may be changed as appropriate. The index change unit 162e (FIG. 12) is configured to change the load index Iw according to an environmental condition such as humidity or atmospheric temperature. For an example, a paper case such as a corrugated cardboard box is likely to have a load bearing that decreases as the humidity increases. Therefore, for example, when a value of detected humidity becomes larger than a threshold value, the index change unit 162e is allowed to change the load index Iw or the reduction coefficient to be smaller than a normal set value, based on the detected value of a humidity sensor as the sensor 103. For example, the index change unit 162e is allowed to reduce the reduction coefficient r in a season having higher humidity relative to a season having lower humidity. Furthermore, the index change unit 162e is configured to change the load index Iw or the reduction coefficient r, for example, according to a value input based on operation of the input device 104 by the operator.

As described above, in the present embodiment, the transport unit forming apparatus 100 (article processing apparatus) includes the configuration determination unit 162 that determines the configuration of a transport unit 10 in which a plurality of article groups 20 is stacked, the palletizing mechanism 110 that forms an article group 20 whose configuration is determined by the configuration determination unit 162, and the stacking mechanism 140 that forms a transport unit 10 whose configuration is determined by the configuration determination unit 162.

Such a configuration makes it possible to determine the configurations of an article group 20 and transport unit 10 by arithmetic processing on a computer, and form the article group 20 and transport unit 10 that have the determined configuration, and thus, for example it is possible to advantageously form the transport unit 10 more reliably or more quickly.

Furthermore, in the present embodiment, for example, the stacking mechanism 140 has the lift mechanism 130 configured to move an article group 20 and a stack 20S substantially vertically, and the conveyance mechanisms 120B21 and 120B22 (slide mechanism) each configured to move an article group 20 substantially horizontally.

Such a configuration makes it possible, for example, to achieve the stacking mechanism 140 configured to form a transport unit 10, with a relatively simple configuration.

Furthermore, in the present embodiment, for example, in the stacking mechanism 140, the lift mechanism 130 places another article group 20 or stack 20S (a plurality of article groups 20 previously stacked), on an article group 20 moved to a delivery position Ps11 (predetermined position) by the conveyance mechanisms 120B21 and 120B22.

If the lift mechanism 130 lifts and places an article group 20 on a stack 20S, a vertical moving distance of a movable portion of the lift mechanism 130 tends to be increased. In this respect, the configuration in which the lift mechanism 130 lifts and places a stack 20S on an article group 20 as in the present embodiment makes it possible to reduce the vertical moving distance of the movable portion of the lift mechanism 130. Therefore, in stacking, it is possible to advantageously suppress, for example, the shaking of the article group 20 or the stack 20S due to the vertical movement and further suppress the displacement of an article 22.

Furthermore, in the present embodiment, for example, the transport unit forming apparatus 100 includes the plurality of palletizing mechanisms 110.

Such a configuration makes it possible, for example, to quickly form an article group 20 and further a transport unit 10, compared with a configuration including one palletizing mechanism 110.

Furthermore, in the present embodiment, for example, the transport unit forming apparatus 100 includes the detection mechanism 150 between the palletizing mechanism 110 and the stacking mechanism 140, and the detection mechanism 150 is configured to detect, at a plurality of positions, the heights of an article group 20 configured by the palletizing mechanism 110.

Such a configuration makes it possible, for example, to check whether an article group 20 is formed by the palletizing mechanism 110 so that another pallet 21, that is, another article group 20 may be placed thereon.

Furthermore, in the present embodiment, for example, the transport unit forming apparatus 100 includes the conveyance mechanism 120A (exclusion mechanism) configured to convey an article group 20 having heights that is detected at a plurality of positions and do not satisfy a predetermined condition, to the exclusion position Pe different from the stacking mechanism 140.

Such a configuration makes it possible, for example, to avoid malfunction of the stacking mechanism 140, such as forming of a transport unit 10 having poor quality or failure in forming of a transport unit 10. Furthermore, for example, it is possible to advantageously make an adjustment of an article group 20 at the exclusion position Pe.

Furthermore, in the present embodiment, for example, the palletizing mechanism 110 places at least one article 22 on a pallet 21 or on another article 22 placed on the pallet 21 so that a side surface 22a to which the identification information 22a1 of the article 22 is applied is exposed from a side surface 20a of the article group 20.

Such a configuration makes it possible, for example, to advantageously facilitate identification of an article 22 included in a transport unit 10 and article group 20.

Furthermore, in the present embodiment, for example, the transport unit forming apparatus 100 includes the palletizing mechanism 110 configured to form an article group 20 and the stacking mechanism 140 configured to stack a plurality of article groups 20 to form a transport unit 10.

Such a configuration makes it possible, for example, to advantageously form a transport unit 10 automatically, more quickly or more reliably.

Although the embodiment of the present disclosure has been described above as an example, the embodiment is merely an example and not intended to limit the scope of the disclosure. The embodiment described above may be carried out in various other modes, and various omissions, replacements, combinations, and modifications may be made without departing from the spirit of the disclosure. In addition, specifications (i.e., structures, types, directions, models, sizes, lengths, widths, thicknesses, heights, numbers, arrangements, positions, materials, etc.) such as the configurations or the shapes may be changed as appropriate and carried out.

For example, the number of the conveyance mechanisms, reception positions, palletizing positions, stacking places, shipping positions, positions of the check mechanisms, exclusion positions, and the like or the layouts thereof are not limited to the embodiment described above.

Furthermore, the transport unit may be wrapped with film or the like.

Although the disclosure has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An article processing apparatus comprising:
   a configuration determination unit configured to determine a configuration of at least one transport unit, the at least one transport unit including
      articles, and
      stacked article groups each including
         a pallet, and
         at least one of the articles placed on the pallet, wherein the at least one of the articles is placed on the pallet in a manner that allows a pallet of another article group to be placed thereon, excluding uppermost one of the stacked article groups;
   a palletizing mechanism configured to place the at least one of the articles on the pallet so as to form a plurality of columns of substantially same height on the pallet, and to form each of the article groups included in the transport unit whose configuration is determined by the configuration determination unit; and
   a stacking mechanism configured to stack the article groups formed by the palletizing mechanism so as to form the transport unit determined by the configuration determination unit.

2. The article processing apparatus according to claim 1, wherein the stacking mechanism includes:
   a lift mechanism configured to move one of the article groups and the stacked article groups in a substantially vertical direction; and
   a slide mechanism configured to move the one of the article groups and the stacked article groups in a substantially horizontal direction.

3. The article processing apparatus according to claim 2, wherein the lift mechanism is configured to place the other article group or the previously stacked article groups, on the article group that has been moved to a predetermined position by the slide mechanism.

4. The article processing apparatus according to claim 1, wherein the palletizing mechanism includes a plurality of palletizing mechanisms.

5. The article processing apparatus according to claim 1, further comprising a detection mechanism configured to detect heights of the article group formed by the palletizing mechanism, at a plurality of positions, between the palletizing mechanism and the stacking mechanism.

6. The article processing apparatus according to claim 5, further comprising an exclusion mechanism configured to convey the article group whose heights detected at the plurality of positions do not satisfy a predetermined condition, to an exclusion position different from the stacking mechanism.

7. The article processing apparatus according to claim 1, wherein the palletizing mechanism is configured to place the at least one of the articles on the pallet or on another one of the articles already placed on the pallet such that a side surface on which identification information of the at least one of the articles is applied is exposed from a side surface of the article group.

8. An article processing apparatus comprising:
   a palletizing mechanism configured to
      place articles on a pallet to form a plurality of columns of substantially same height on the pallet so as to allow another pallet is to be placed on the articles, and
      form article groups each including the pallet and the articles; and
   a stacking mechanism configured to stack the article groups to form a transport unit.

9. The article processing apparatus according to claim 8, wherein the stacking mechanism includes:
   a lift mechanism configured to move one of the article groups and the stacked article groups in a substantially vertical direction; and
   a slide mechanism configured to move the one of the article groups and the stacked article groups in a substantially horizontal direction.

10. The article processing apparatus according to claim 9, wherein the lift mechanism is configured to place another article group or the previously stacked article groups, on the article group that has been moved to a predetermined position by the slide mechanism.

* * * * *